United States Patent
Zhang et al.

(10) Patent No.: US 9,954,751 B2
(45) Date of Patent: Apr. 24, 2018

(54) MEASURING PERFORMANCE OF A NETWORK USING MIRRORED PROBE PACKETS

(71) Applicant: Microsoft Technology Licensing, LLC, Redmond, WA (US)

(72) Inventors: Ming Zhang, Redmond, WA (US); Guohan Lu, Redmond, WA (US); Lihua Yuan, Redmond, WA (US); Yibo Zhu, Goleta, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 46 days.

(21) Appl. No.: 14/726,245

(22) Filed: May 29, 2015

(65) Prior Publication Data

US 2016/0352601 A1    Dec. 1, 2016

(51) Int. Cl.
| | | |
|---|---|---|
| *G06F 15/16* | (2006.01) | |
| *H04L 12/26* | (2006.01) | |
| *H04L 12/24* | (2006.01) | |

(52) U.S. Cl.
CPC ...... *H04L 43/0823* (2013.01); *H04L 41/0645* (2013.01); *H04L 43/0829* (2013.01);
(Continued)

(58) Field of Classification Search
CPC ........................................................ H04L 43/00
(Continued)

(56) References Cited

U.S. PATENT DOCUMENTS

| | | |
|---|---|---|
| 4,013,999 A | 3/1977 | Erwin et al. |
| 6,697,365 B1 | 2/2004 | Messenger |
| | (Continued) | |

FOREIGN PATENT DOCUMENTS

| | | |
|---|---|---|
| CN | 1481176 A | 3/2004 |
| CN | 1802837 A | 7/2006 |
| | (Continued) | |

OTHER PUBLICATIONS

"DPDK: Data Plane Development Kit," available at <<http://www.dpdk.org/>>, retrieved on Mar. 25, 2015, 2 pages.
(Continued)

*Primary Examiner* — Adnan Mirza
(74) *Attorney, Agent, or Firm* — Rainier Patents, P.S.

(57) ABSTRACT

Functionality is described herein for measuring the performance of a network. The functionality operates by generating a probe packet and injecting the probe packet into the network. The probe packet is configured, using one or more layers of encapsulation, to target a particular network component of interest in the network, or to target a particular collection of network components in the network. A switch to which the probe packet is addressed operates by: (a) generating mirrored information that is associated with the probe packet; (b) decapsulating the probe packet (with respect to its outermost encapsulation) to produce a new probe packet; and (c) passing the new probe packet to a downstream network component, in accordance with a destination address associated with the new probe packet. The functionality uses the mirrored information that has been collected in the above manner to detect various anomalies in the network.

21 Claims, 11 Drawing Sheets

(52) U.S. Cl.
CPC .......... *H04L 43/0864* (2013.01); *H04L 43/14* (2013.01); *H04L 43/00* (2013.01); *H04L 43/10* (2013.01); *H04L 43/12* (2013.01)

(58) Field of Classification Search
USPC ........................................................ 709/225
See application file for complete search history.

(56) References Cited

U.S. PATENT DOCUMENTS

| | | | |
|---|---|---|---|
| 6,766,371 | B1 | 7/2004 | Hipp et al. |
| 6,795,655 | B1 | 9/2004 | Sidorovich et al. |
| 6,801,949 | B1 | 10/2004 | Bruck et al. |
| 6,907,395 | B1 | 6/2005 | Hunt et al. |
| 6,961,315 | B1 | 11/2005 | Amster et al. |
| 6,977,416 | B2 | 12/2005 | Nakazawa et al. |
| 6,999,462 | B1 | 2/2006 | Acharya |
| 7,031,304 | B1 | 4/2006 | Arberg et al. |
| 7,092,410 | B2 | 8/2006 | Bordonaro et al. |
| 7,127,508 | B2 | 10/2006 | Edmison et al. |
| 7,177,271 | B2 | 2/2007 | Shao et al. |
| 7,272,613 | B2 | 9/2007 | Sim et al. |
| 7,296,268 | B2 | 11/2007 | Darling et al. |
| 7,333,482 | B2 | 2/2008 | Johansson et al. |
| 7,382,782 | B1 | 6/2008 | Ferguson et al. |
| 7,457,868 | B1 | 11/2008 | Guo |
| 7,487,541 | B2 | 2/2009 | Robert |
| 7,512,702 | B1 | 3/2009 | Srivastava et al. |
| 7,571,470 | B2 | 8/2009 | Arregoces et al. |
| 7,590,727 | B1 | 9/2009 | Barnes |
| 7,613,155 | B2 | 11/2009 | Shim |
| 7,613,822 | B2 | 11/2009 | Joy |
| 7,626,938 | B1 | 12/2009 | Orr et al. |
| 7,698,460 | B2 | 4/2010 | Zhang et al. |
| 7,710,867 | B1 | 5/2010 | Masters |
| 7,898,970 | B2 | 3/2011 | Klinker |
| 7,961,637 | B2 | 6/2011 | McBeath |
| 8,005,011 | B2 | 8/2011 | Yang |
| 8,125,985 | B1 | 2/2012 | Aybay et al. |
| 8,130,661 | B2 | 3/2012 | Kannan et al. |
| 8,160,063 | B2 | 4/2012 | Maltz |
| 8,248,928 | B1 | 8/2012 | Wang |
| 8,427,958 | B2 | 4/2013 | Ko et al. |
| 8,539,094 | B1 | 9/2013 | Marr |
| 8,547,855 | B1 | 10/2013 | Zingale et al. |
| 8,634,297 | B2 | 1/2014 | Mishra et al. |
| 8,675,502 | B2 | 3/2014 | Blair |
| 8,869,267 | B1 | 10/2014 | Smith et al. |
| 8,942,237 | B2 | 1/2015 | Benny et al. |
| 8,958,327 | B2 | 2/2015 | Watve et al. |
| 2001/0055274 | A1 | 12/2001 | Hegge et al. |
| 2002/0032871 | A1 | 3/2002 | Malan et al. |
| 2002/0034162 | A1 | 3/2002 | Brinkerhoff et al. |
| 2002/0141479 | A1 | 10/2002 | Garcia-Luna-Aceves et al. |
| 2002/0184368 | A1 | 12/2002 | Wang |
| 2002/0184383 | A1 | 12/2002 | Song |
| 2003/0009559 | A1 | 1/2003 | Ikeda |
| 2003/0046388 | A1 | 3/2003 | Milliken |
| 2003/0076846 | A1 | 4/2003 | Heinz et al. |
| 2003/0154236 | A1 | 8/2003 | Dar et al. |
| 2003/0195919 | A1 | 10/2003 | Watanuki et al. |
| 2003/0204634 | A1 | 10/2003 | Pinkerton et al. |
| 2004/0236547 | A1 | 11/2004 | Rappaport et al. |
| 2004/0267920 | A1 | 12/2004 | Hydrie et al. |
| 2005/0003828 | A1 | 1/2005 | Sugar et al. |
| 2005/0027862 | A1 | 2/2005 | Nguyen et al. |
| 2005/0050272 | A1 | 3/2005 | Behrens et al. |
| 2005/0278415 | A1 | 12/2005 | Corbea et al. |
| 2006/0002370 | A1 | 1/2006 | Rabie et al. |
| 2006/0245406 | A1 | 11/2006 | Shim |
| 2006/0271655 | A1 | 11/2006 | Yoon et al. |
| 2007/0002770 | A1 | 1/2007 | Haalen et al. |
| 2007/0033645 | A1 | 2/2007 | Jones |
| 2007/0147339 | A1 | 6/2007 | Forissier et al. |
| 2007/0189191 | A1 | 8/2007 | Ades |
| 2007/0245352 | A1 | 10/2007 | Ma et al. |
| 2007/0250608 | A1 | 10/2007 | Watt |
| 2007/0280124 | A1 | 12/2007 | Bivens et al. |
| 2007/0280243 | A1 | 12/2007 | Wray et al. |
| 2008/0080390 | A1 | 4/2008 | Ebuchi et al. |
| 2008/0080552 | A1 | 4/2008 | Gates et al. |
| 2008/0130616 | A1 | 6/2008 | Wengerter et al. |
| 2008/0225474 | A1 | 9/2008 | Flynn et al. |
| 2008/0239983 | A1 | 10/2008 | Bivens et al. |
| 2008/0275975 | A1 | 11/2008 | Pandey et al. |
| 2008/0310422 | A1 | 12/2008 | Booth et al. |
| 2009/0063706 | A1 | 3/2009 | Goldman et al. |
| 2009/0083403 | A1 | 3/2009 | Xu et al. |
| 2009/0106529 | A1 | 4/2009 | Abts et al. |
| 2009/0129384 | A1 | 5/2009 | Regan |
| 2009/0154766 | A1 | 6/2009 | Quine et al. |
| 2009/0196620 | A1 | 8/2009 | Ozeki et al. |
| 2009/0201293 | A1 | 8/2009 | Tung et al. |
| 2009/0235097 | A1 | 9/2009 | Hamilton et al. |
| 2010/0036903 | A1 | 2/2010 | Ahmad et al. |
| 2010/0061240 | A1 | 3/2010 | Sindhu et al. |
| 2010/0246482 | A1 | 9/2010 | Erceg et al. |
| 2010/0302940 | A1 | 12/2010 | Patel et al. |
| 2010/0306408 | A1 | 12/2010 | Greenberg et al. |
| 2011/0087799 | A1 | 4/2011 | Padhye et al. |
| 2011/0150489 | A1 | 6/2011 | Davidson et al. |
| 2011/0185091 | A1 | 7/2011 | Rofougaran et al. |
| 2011/0243074 | A1 | 10/2011 | Shin et al. |
| 2012/0041965 | A1 | 2/2012 | Vasquez et al. |
| 2012/0084419 | A1 | 4/2012 | Kannan et al. |
| 2012/0250682 | A1 | 10/2012 | Vincent et al. |
| 2013/0047151 | A1 | 2/2013 | Sridharan et al. |
| 2013/0159487 | A1 | 6/2013 | Patel et al. |
| 2013/0163426 | A1 | 6/2013 | Beliveau et al. |
| 2013/0191829 | A1 | 7/2013 | Shimokawa et al. |
| 2014/0269266 | A1* | 9/2014 | Filsfils ................... H04L 43/50 370/228 |
| 2014/0369227 | A1 | 12/2014 | Salonidis et al. |
| 2014/0369347 | A1 | 12/2014 | Orsley |
| 2015/0063353 | A1 | 3/2015 | Kapadia et al. |
| 2015/0081893 | A1 | 3/2015 | Chadwell et al. |
| 2015/0124831 | A1 | 5/2015 | Kumar et al. |
| 2015/0222452 | A1* | 8/2015 | Ng ..................... H04L 12/6418 370/392 |

FOREIGN PATENT DOCUMENTS

| | | |
|---|---|---|
| CN | 1875603 A | 12/2006 |
| CN | 101553054 A | 10/2009 |
| EP | 1107475 A2 | 6/2001 |
| EP | 1233551 A2 | 8/2002 |
| EP | 1494422 A2 | 1/2005 |
| JP | 2000232483 A | 8/2002 |
| JP | 2004228828 A | 8/2004 |
| JP | 20050257756 | 1/2005 |
| JP | 2005130512 | 5/2005 |
| JP | 2005260594 | 9/2005 |
| JP | 2006074171 A | 3/2006 |
| JP | 2006174399 A | 6/2006 |
| JP | 2007235827 | 9/2007 |
| JP | 2007312434 | 11/2007 |
| JP | 2008042669 A | 2/2008 |
| JP | 2008118577 A | 5/2008 |
| JP | 2008199348 | 8/2008 |
| JP | 200980642 | 4/2009 |
| KR | 20050002608 | 1/2005 |
| KR | 2007-0023697 A | 2/2007 |
| WO | 9930460 A2 | 6/1999 |
| WO | 03087887 A2 | 10/2003 |
| WO | 2010/138937 A2 | 12/2010 |
| WO | 2013040942 A1 | 3/2013 |

OTHER PUBLICATIONS

"Receive Side Scaling," available at <<https://msdn.microsoft.com/en-us/library/windows/hardware/ff567236(v=vs.85).aspx>>, Microsoft Corporation, Redmond, WA, retrieved on Mar. 25, 2015, 1 page.

(56) References Cited

OTHER PUBLICATIONS

Patel, et al., "Ananta: Cloud Scale Load Balancing," in Proceedings of the ACM SIGCOMM Conference on SIGCOMM, Aug. 2013, 12 pages.
Case, et al., "A Simple Network Management Protocol," available at <<https://www.ietf.org/rfc/rfc1157.txt>>, Network Working Group, Request for Comments 1157, May 1990, 34 pages.
Chaiken, et al., "SCOPE: Easy and Efficient Parallel Processing of Massive Data Sets," in Proceedings of the Very Large Data Bases Endowment, vol. 1, Issue 2, Aug. 2008, 12 pages.
Claise, B. (Ed.), "Cisco Systems NetFlow Services Export Version 9," available at <<https://tools.ietf.org/html/rfc3954>>, Network Working Group, Request for Comments 3954, Oct. 2004, 33 pages.
Fayaz, et al., "Testing Stateful and Dynamic Data Planes with FlowTest," in Proceedings of the Third Workshop on Hot Topics in Software Defined Networking, Aug. 22, 2014, 6 pages.
Gandhi, et al., "Duet: Cloud Scale Load Balancing with Hardware and Software," in Proceedings of the ACM Conference on SIGCOMM, Aug. 17, 2014, 12 pages.
Gvozdiev, et al., "LOUP: Who's Afraid of the Big Bad Loop?," in Proceedings of the 11th ACCM Workshop on Hot Topics in Networks, Oct. 2012, 6 pages.
Hong, et al., "Tiresias: Online Anomaly Detection for Hierarchical Operational Network Data," in Proceedings of the IEEE 32nd International Conference on Distributed Computing Systems, Jun. 2012, 10 pages.
"InfiniBand Architecture vol. 1, Version 1.2.1," available at <<http://www.infinibandta.org/content/pages.php?pg=technology_public_specification>>, InfiniBand Trade Association, Nov. 2007, 1727 pages.
Jeyakumar, et al., "Millions of Little Minions: Using Packets for Low Latency Network Programming and Visibility," in Proceedings of the ACM Conference on SIGCOMM, Aug. 17, 2014, 12 pages.
Kandula, et al., "The Nature of Data Center Traffic: Measurements & Analysis," in Proceedings of the 9th ACM SIGCOMM Conference on Internet Measurement Conference, Nov. 2009, 7 pages.
Koponen, et al., "Network Virtualization in Multi-tenant Datacenters," in Proceedings of the 11th USENIX Symposium on Networked Systems Design and Implementation, Apr. 2, 2014, 15 pages.
Liu, et al., "SAND: A Fault-Tolerant Streaming Architecture for Network Traffic Analytics," in Proceedings of the 44th Annual IEEE/IFIP International Conference on Dependable Systems and Networks, Jun. 23, 2014, 8 pages.
Mahajan, et al., "User-Level Internet Path Diagnosis," in Proceedings of the Nineteenth ACM Symposium on Operating Systems Principles, Oct. 2003, 14 pages.
Malkin, G., "Traceroute Using an IP Option," available at <<http://www.rfc-base.org/txt/rfc-1393.txt>>, Network Working Group, Request for Comments 1393, Jan. 1993, 7 pages.
Marchetta, et al., "Dissecting Round Trip Time on the Slow Path with a Single Packet," in Proceedings of the15th International Conference on Passive and Active Measurement, Mar. 10, 2014, 10 pages.
Phaal, et la., "InMon Corporation's sFlow: A Method for Monitoring Traffic in Switched and Routed Networks," available at <<https://tools.ietf.org/html/rfc3176>>, Network Working Group, Request for Comments 3176, Sep. 2001, 31 pages.
Qiu, et al., "What Happened in My Network: Mining Network Events from Router Syslogs," in Proceedings of the 10th ACM SIGCOMM Conference on Internet Measurement, Nov. 2010, 13 pages.
Rasley, et al., "Planck: Millisecond-Scale Monitoring and Control for Commodity Networks," in Proceedings of the ACM Conference on SIGCOMM, Aug. 17, 2014, 12 pages.
Rizzo, Luigi, "Netmap: a novel framework for fast packet I/O," in Proceedings of the 21st USENIX Security Symposium, Aug. 2012, 12 pages.
Wu, et al., "WireCAP: a Novel Packet Capture Engine for Commodity NICs in High-Speed Networks," in Proceedings of the Conference on Internet Measurement Conference, Nov. 2014, 12 pages.
Yu, et al., "Software Defined Traffic Measurement with OpenSketch," in Proceedings of 10th USENIX Symposium on Networked Systems Design and Implementation, Apr. 2013, 14 pages.
Zhang, et al., "Collecting and Analyzing Selected Network Traffic," U.S. Appl. No. 14/475,927, filed on Sep. 3, 2014, 62 pages.
Zou, et al., "PktTrace: A Packet Life-Cycle Tracking Tool for Network Services in a Software-Defined Data Center," in VMware Technical Journal, Jun. 27, 2014, 6 pages.
Sommers, et al., "A Geometric Approach to Improving Active Packet Loss Measurement," in IEEE/ACM Transactions on Networking, vol. 16, Issue 2, Apr. 2008, 14 pages.
PCT Search Report and Written Opinion for PCT/US2015/021124, mailed on Jul. 7, 2015, 14 pages.
"A10 Customer Driven Innovation," retrieved on Dec. 20, 2013 at <<http://www.a10networks.com/>>, 1 page.
"Amazon Web Services," retrieved on Dec. 20, 2013 at <<http://aws.amazon.com/>>, 2 pages.
"AX ADC Application Delivery Controller," retrieved at <<http://www.a10networks.com/products/axseries_adc.php>> on Mar. 21, 2014, A10 Networks, San Jose, CA, 2 pages.
"Cisco—Data Center Ethernet", retrieved at <<http://www.cisco.com/en/US/netsol/ns783/index.html>> on May 25, 2009, 2 pages.
"Cisco: Data center: Load balancing data center services, SRND", Mar. 2004, retrieved at <<https://cisco.hosted.jivesoftware.com/servlet/JiveServlet/previewBody/3438-102-1-9467/cdccont_0900aecd800eb95a.pdf%3Bjsessionid=D15FC693EE8863EC7D2158BB98FFEAF8>>, 94 pages.
"Citrix delivers Cloud Solutions that enable Mobile Workstyles," retrieved on Dec. 20, 2013 at <<http://www.citrix.com/>>, 2 pages.
"Embrane," retrieved on Dec. 20, 2013 at <<http://www.embrane.com/>>, 1 page.
"Embrane heleos-powered Load Balancer," retrieved at <<http://www.embrane.com/products/load-balancer>> on Mar. 21, 2014, Embrane, Inc., Santa Clara, CA, 2 pages.
"F5 Networks," retrieved on Dec. 20, 2013 at <<http://www.f5.com/>>, 1 page.
"F5 Networks," retrieved at http://en.wikipedia.org/wiki/F5_Networks>> on Mar. 21, 2014, Wikipedia entry, 6 pages.
"Google Cloud Platform," retrieved on Dec. 20, 2013 at <<https://cloud.google.com/>>, 8 pages.
"HaProxy: The Reliable, High Performance TCP/HTTP Load Balancer," retrieved at <<http://haproxy.1wt.eu/>> on Mar. 21, 2014, 12 pages.
"InfiniBand Trade Association, Supplement to InfiniBand Architecture Specification," vol. 1 Release 1.2.2 annex A17: RoCEv2, 2014, 23 pages.
"Why do I need two load balancers?" retrieved at <<http://www.loadbalancer.org/>> on Mar. 21, 2014, 2 pages.
"Load Balancing," retrieved at <<http://wilsonmar.com/1loadbal.htm>> on May 25, 2009, 10 pages.
"Microsoft Developer Network," retrieved on Dec. 20, 2013 at <<http://msdn.microsoft.com/en-gb/default.aspx>>, 3 pages.
"NetScaler Application Delivery Controller," retrieved at <<http://www.citrix.com/netscalervpx>> on Mar. 21, 2014, Citrix Systems, Inc., Santa Clara, CA, 2 pages.
"Rackspace: The Leader in Hybrid Cloud," retrieved on Dec. 20, 2013 at <<http://www.rackspace.com/>>, 2 pages.
"Riverbed," retrieved on Dec. 20, 2013 at <<http://www.riverbed.com>>, 2 pages.
"Softgrid Networking White paper", Retrieved at <<http://blog.caloni.net/post/369608/Softgrid+Networking+White+paper>>, May 11, 2007, 2 pages.
"TCP Connection Forwarding", Retrieved at <<http://www.bluecoat.com/node/2804>>, 4 pages.
"Vyatta Software Middlebox," retrieved on Dec. 20, 2013 at <<http://www.vyatta.com>, 1 page.

(56) References Cited

OTHER PUBLICATIONS

"Windows Filtering Platform," retrieved on Dec. 20, 2013 at <<http://msdn.microsoft.com>>, 2 pages.
"Zscaler," retrieved on Dec. 20, 2013 at <<http://www.zscaler.com/>>, 2 pages.
Al-Fares, et al. "A Scalable, Commodity Data Center Network Architecture", SIGCOMM '08, Aug. 17-22, 2008, Seattle, WA, pp. 63-74, 12 pages.
Alizadeh et al., "Data Center TCP (DCTCP)," Proceedings of the ACM SIGCOMM 2010 Conference, Aug. 30-Sep. 3, 2010, New Delhi, India, 12 pages.
Armbrust et al., "Above the Clouds: A Berkeley View of Cloud Computing," UC Berkeley Reliable Adaptive Distributed Systems Laboratory, Feb. 10, 2009, 23 pages.
Arregoces et al. "Data Center Design Overview," retrieved at <<http://techrepublic.com.com/i/tr/downloads/home/1587050234_chapter_4.pdf>> Dec. 4, 2003, Issue 1, Cisco Press, pp. 116-157, 42 pages.
Benson et al., "CloudNaaS: A Cloud Networking Platform for Enterprise Applications," Proceedings of 2nd ACM Symposium on Cloud Computing, Oct. 26, 2011, 13 pages.
Bodik et al., "Surviving Failures in Bandwidth-Constrained Datacenters," Proceedings of the ACM SIGCOMM 2012 Conference on Applications, Technologies, Architectures, and Protocols for Computer Communication, Aug. 13-17, 2012, Helsinki, Finland, 12 pages.
Bosshart et al., "Forwarding Metamorphosis: Fast Programmable Match-Action Processing in Hardware for SDN," SIGCOMM '13, Aug. 12-16, 2013, Hong Kong, China, 12 pages.
Bourke, Tony, "Bridge-Path vs. Route-Path Server Load Balancing", Nov. 11, 2000, retrieved at <<http:www.oreillynet.com/pub/a/oreilly/networking/news/bourke_1100.html>> on May 25, 2009, 6 pages.
Chang et al., "Load Balanced Birkhoff-Von Neumann Switches," retrieved at <<http://ieeexplore.ieee.org/stamp/stamp.jsp?tp=&isnumber=&arnumber=923646>> 2001, pp. 276-280, 5 pages.
Chase et al. "Balance of Power: Energy Management for Server Clusters," retrieved at <<http://reference.kfupm.edu.sa/content/b/a/balance_of_power_energy_management_for_741068.pdf>>, 2001, 6 pages.
Chawla et al., "Replicating IP Services," retrieved at <<http://reference.kfupm.edu.sa/content/r/e/replicating_ip_services_1179231.pdf>>, Technical Report 97-008, 18 pages.
Cho et al., "An Efficient Location and Routing Scheme for Mobile Computing Environments," IEEE Journal on Selected Areas in Communications, vol. 13, No. 5, Jun. 1995, 11 pages.
Claffy et al., "A Parameterizable Methodology for Internet Traffic Flow Profiling," IEEE Journal on Selected Areas in Communications, vol. 13, No. 8, Oct. 1995, 14 pages.
Cranor et al., "Gigascope: High Performance Network Monitoring with an SQL Interface," Proceedings of ACM SIGMOD International Conference on Management of Data, Jun. 3-6, 2002, Madison, Wisconsin, 1 page.
Das, Sujal, "Avoiding Network Polarization and Increasing Visibility in Cloud Networks Using Broadcom Smart-Hash Technology," retrieved at <<http://www.broadcom.com/collateral/wp/StrataXGS_SmartSwitch-WP200-R.pdf>>, Broadcom Corporation, Irvine, CA, Aug. 2012, 9 pages.
Dixon et al., "ETTM: A Scalable Fault Tolerant Network Manager," Proceedings of 8th USENIX Conference on Networked Systems Design and Implementation, Mar. 30, 2011, 14 pages.
Dobrescu et al., "RouteBricks: Exploiting Parallelism to Scale Software Routers," Proceedings of ACM SIGOPS 22nd Symposium on Operating Systems Principles, Oct. 11, 2009, 14 pages.
Duffield et al. "A Flexible Model for Resource Management in Virtual Private Networks", retrieved at <<http://citeseerx.ist.psu.edu/viewdoc/download?doi=10.1.1.44.9104&rep=rep1&type=pdf>> 1999, 14 pages.
Egi et al., "Towards High Performance Virtual Routers on Commodity Hardware," Proceedings of ACM CoNEXT Conference, Dec. 9, 2008, 12 pages.
Fayazbakhsh et al., "Flowtags: Enforcing Network-Wide Policies in the Presence of Dynamic Middlebox Actions," Proceedings of the Second ACM SIGCOMM Workshop on Hot Topics in Software Defined Networking, Aug. 16, 2013, Hong Kong, China, 6 pages.
Fogel et al., "A General Approach to Network Configuration Analysis," NSDI, 2015, 15 pages.
Gill et al., "Understanding Network Failures in Data Centers: Measurement, Analysis, and Implications," ACMSIGCOMM Computer Communication Review, vol. 41, 2011, 12 pages.
Gordon et al., "Hypercube Message Routing in the Presence of Faults," SIGARCH Third Conference on Hypercube Concurrent Computers and Applications, Jan. 19-20, 1988, 10 pages.
Greenberg et al., "The Cost of a Cloud: Research Problems in Data Center Networks," ACM SIGCOMM Computer Communication Review, vol. 39, No. 1, Jan. 2009, 6 pages.
Greenberg et al., "Towards a Next Generation Data Center Architecture: Scalability and Commoditization," PRESTO '08, Aug. 22, 2008, Seattle, WA, 6 pages.
Greenberg et al., "VL2: A Scalable and Flexible Data Center Network," SIGCOMM'09, Aug. 17-21, 2009, Barcelona, Spain, 12 pages.
Guo et al., "BCube: A High Performance, Server-centric Network Architecture for Modular Data Centers," SIGCOMM '09, Aug. 17-21, 2009, Barcelona, Spain, 12 pages.
Guo et al., "DCell: A Scalable and Fault-Tolerant Network Structure for Data Centers," SIGCOMM '08, Aug. 17-22, 2008, Seattle, WA, 12 pages.
Hamilton, James, "An Architecture for Modular Data Centers", Third Biennial Conference on Innovative Data Systems Research, Jan. 7-10, 2007, Asilomar, CA, 8 pages.
Hamilton, James, "Cooperative Expendable Micro-Slice Servers (CEMS): Low Cost, Low Power Servers for Internet-Scale Services", 4th Biennial Conference on Innovative Data Systems Research, Jan. 4-7, 2009, Asilomar, CA, 8 pages.
Hamilton, James, "The Cost of Latency," Perspectives: James Hamilton's Blog, Oct. 31, 2009, retrieved at <<http://perspectives.mvdirona.com/2009/10/31/TheCostOfLatency.aspx>> on Mar. 21, 2014, 3 pages.
Handigol et al., "Plug-n-Serve: Load-Balancing Web Traffic Using OpenFlow," ACM SIGCOMM Demo, 2009, 2 pages.
Handley et. al., "TCP Friendly Rate Control (TFRC): Protocol Specification," Jan. 2003, retrieved at <<http://www.ietf.org/rfc/rfc3448.txt>> on May 25, 2009, pp. 1-23.
Heffernan, A, "Protection of BGP Sessions via the TCP MD5 Signature Option," Network Working Group, Request for Comments: 2385, Aug. 1998, retrieved from <<http://www.ietf.org/rfc/rfc2385.txt>>, 6 pages.
Hong et al., "Achieving High Utilization with Software-Driven WAN," SIGCOMM '13, Aug. 12-16, 2013, Hong Kong, China, 12 pages.
Jain et al., "B4: Experience with a Globally-Deployed Software Defined WAN," SIGCOMM '13, Aug. 12-16, 2013, Hong Kong, China, 12 pages.
Kallahalla et al., "SoftUDC: A Software-Based Data Center for Utility Computing," retrieved at <<http://ieeexplore.ieee.org/stamp/stamp.jsp?tp=&arnumber=1362586&isnumber=29851>> on May 25, 2009, vol. 37, Issue 11, Nov. 2004, pp. 38-46, 9 pages.
Kandula et al., "Walking the Tightrope: Responsive Yet Stable Traffic Engineering," SIGCOMM '05, Aug. 21-26, 2005, 12 pages.
Kim et al., "Floodless in SEATTLE: A Scalable Ethernet Architecture for Large Enterprises," retrieved at <<http://www.cs.princeton.edu/~chkim/Research/SEATTLE/seattle.pdf>>, Aug. 17-22, 2008, Seattle, USA, 14 pages.
Kodialam et al., "Efficient and Robust Routing of Highly Variable Traffic," retrieved at <<http://conferences.sigcomm.org/hotnets/2004/HotNets-III%20Proceedings/kodialam.pdf>>, 2004, 6 pages.
Lamport, Leslie, "The Part-Time Parliament," ACM Transactions on Computer Systems, May 1998, vol. 16, Issue 2, New York, USA, pp. 1-33.

(56) References Cited

OTHER PUBLICATIONS

Lu et al., "Using CPU as a Traffic Co-processing Unit in Commodity Switches," Proceedings of the 1st Workshop on Hot Topics in Software Defined Networks, Aug. 13, 2012, Helsinki, Finland, 6 pages.
Mann et al., "Living on the Edge: Monitoring Network Flows at the Edge in Cloud Data Centers," COMSNET, 2013 IEEE, 9 pages.
Mathis et al. "TCP Extended Statistics MIB," Network Working Group, Request for Comments: 4898, May 2007, retrieved at <<http://www.ietf.org/rfc/rfc4898.txt>> on May 25, 2009, 71 pages.
McKeown et al., "OpenFlow: Enabling Innovation in Campus Networks," Proceedings of ACM SIGCOMM Computer Communication Review, vol. 38, Issue 2, Apr. 2008, 6 pages.
Meyer et al., "Locator/ID Separation Protocol (LISP)", retrieved at <<http://www.ietf.org/proceedings/07mar/slides/RRG-0.pdf>>, Mar. 17, 2007, 21 pages.
Microsoft Windows Azure, retrieved on Dec. 20, 2013 at <<http://www.windowsazure.com/en-us/>>, 2 pages.
Moshref et al., "Scalable Rule Management for Data Centers," Proceedings of the 10th USENIX Symposium on Networked Systems Design and Implementation, Apr. 2013, 14 pages.
Perkins, C., "IP Encapsulation within IP," Oct. 1996, Network Working Group, Request for Comment: 2003, retrieved at <<http://tools.ietf.org/search/rfc2003>>, 15 pages.
Plummer, David, C., "An Ethernet Address Resolution Protocol—or—Converting Network Protocol Addresses," Network Working Group, Request for Comments: 826, Nov. 1982, retrieved at <<http://www.ietf.org/rfc/rfc826.txt>> on May 25, 2009, 8 pages.
Qazi et al., "SIMPLE-fying Middlebox Policy Enforcement Using SDN," Proceedings of the ACM SIGCOMM 2013 Conference, Aug. 12-16, 2013, Hong Kong, China, 12 pages.
Ravindranath et al., "Timecard: Controlling User-Perceived Delays in Server-Based Mobile Applications," Proceedings of the Twenty-Fourth ACM Symposium on Operating Systems Principles, Nov. 3-6, 2013, Farmington, PA, 16 pages.
Sekar et al., "The Middlebox Manifesto: Enabling Innovation in Middlebox Deployment," Proceedings of 10th ACM Workshop on Hot Topics in Networks, Nov. 14-15, 2011, Cambridge, MA, 6 pages.
Sherry et al., "Making Middleboxes Someone Else's Problem: Network Processing as a Cloud Service," Proceedings of ACM SIGCOMM Conference on Applications, Technologies, Architectures, and Protocols for Computer Communication, Aug. 13-17, 2012, Helsinki, Finland, 12 pages.
Sinha et al., "Harnessing TCP's Burstiness with Flowlet Switching," HotNets, 2004, 6 pages.
Suh et al., "Opensample: A Low-Latency, Sampling-based Measurement Platform for SDN," ICDCS, 2014 IEEE, 10 pages.
Aryaka home page, retrieved from <<http://arayaka.com>> on Dec. 20, 2013 , 4 pages.
Vetter et al., "An Experimental Study of Insider Attacks for OSPF Routing Protocol," Proceedings International Conference on Network Protocols, Oct. 28-31 1997, 8 pages.
Wang et al., "OpenFlow-Based Server Load Balancing Gone Wild," Proceedings of the 11th USENIX Conference on Hot Topics in Management of Internet, Cloud, and Enterprise Networks and Services, 2011, 6 pages.
Welsh et al., "SEDA: An Architecture for Well-Conditioned, Scalable Internet Services," Proceedings of 18th ACM Symposium on Operating Systems Principles, Oct. 21, 2001, 14 pages.
Wu et al., "Netpilot: Automating Datacenter Network Failure Mitigation," ACM SIGCOMM Computer Communication Review, SIGCOMM '12, vol. 42, Issue 4, Aug. 2012, 12 pages.
Yu et al., "Scalable Flow-Based Networking with DIFANE," Proceedings of the ACM SIGCOMM 2010 Conference, Aug. 30-Sep. 3, 2010, New Delhi, India, 12 pages.
Zhang et al., "Finding Critical Traffic Matrices," retrieved at <<http://www.cs.utexas.edu/~yzhang/papers/critmatdsn05.pdf>>, Jun. 28-Jul. 1, 2005, 10 pages.
Zhang-Shen et al., "Designing a Predictable Internet Backbone Network," retrieved at <<http://citeseerx.ist.psu.edu/viewdoc/download;jsessionid=648B30D83F05493B77E6595130C060E8?doi=10.1.1.59.791&rep=rep1&type=pdf>>, 6 pages.
Zhu et al., "Packet-Level Telemetry in Large Datacenter Networks," SIGCOMM '15, Aug. 17-21, 2015, London, United Kingdom, 13 pages.
Patel et al., "Load Balancing Across Layer-2 Domains," U. S. Appl. No. 61/182,057, filed May 28, 2009, 40 pages.
Non-Final Office Action mailed May 31, 2012 from U.S. Appl. No. 12/605,388, 6 pages.
Response filed Oct. 1, 2012 to Non-Final Office Action mailed May 31, 2012, from U.S. Appl. No. 12/605,388, 23 pages.
Notice of Allowance mailed Dec. 20, 2012 from U.S. Appl. No. 12/605,388, 5 pages.
International Preliminary Report on Patentability and Written Opinion mailed Nov. 29, 2011 from PCT Patent Application No. PCT/US2010/036757, 6 pages.
International Search Report and Written Opinion mailed Dec. 27, 2010, from PCT Patent Application No. PCT/US2010/036757, 10 pages.
Voluntary Amendment filed Aug. 23, 2012 from China Patent Application No. 201080023822.1, 8 pages.
Response filed Apr. 11, 2014 to First Office Action mailed Nov. 28, 2013, from China Patent Application No. 201080023822.1, 11 pages.
Notice on Grant of Patent Right for Invention mailed Jul. 9, 2014, from China Patent Application No. 201080023822.1, 7 pages.
Search Report dated Aug. 12, 2013, from European Patent Application No. 10781357.8, 7 pages.
Response filed Feb. 26, 2014 to Official Communication dated Aug. 29, 2013, from European Patent Application No. 10781357.8, 12 pages.
Notice of Appeal filed Aug. 21, 2015 from Japan Patent Application No. 2012-513343, 18 pages.
Response filed Nov. 28, 2014 to Second Office Action mailed Sep. 2, 2014, from Japan Patent Application No. 2012-513343, 12 pages.
Office Action mailed Apr. 21, 2015, from Japan Patent Application No. 2012-513343, 3 pages.
Office Action mailed Mar. 4, 2014, from Japan Patent Application No. 2012-513343, 17 pages.
Response filed Jun. 3, 2014 to Office Action mailed Mar. 4, 2014, from Japan Patent Application No. 2012-513343, 15 pages.
Second Office Action mailed Sep. 2, 2014, from Japan Patent Application No. 2012-513343, 8 pages.
Amendment filed Apr. 28, 2015, from Korea Patent Application No. 10-2011-7028169, 19 pages.
Greenberg et al., "Agile Data Center Network Architecture," U.S. Appl. No. 61/182,063, filed May 28, 2009, 46 pages.
International Preliminary Report on Patentability and Written Opinion mailed Nov. 29, 2011 from PCT Patent Application No. PCT/US2010/036758, 5 pages.
International Search Report and Written Opinion mailed Jan. 3, 2011 from PCT Patent Application No. PCT/US2010/036758, 12 pages.
Request for Examination and Voluntary Amendment filed May 28, 2015, from Canada Patent Application No. 2763032, 11 pages.
Response filed Sep. 8, 2015 to Third Office Action from China Patent Application No. 201080024662.2, 13 pages.
Response filed Sep. 15, 2014 to Office Action mailed Apr. 30, 2014 from China Patent Application No. 201080024662.2, 12 pages.
Third Office Action and Search Report mailed Jun. 24, 2015 from China Patent Application No. 201080024662.2, 15 pages.
First Office Action and Search Report mailed Apr. 30, 2014 from China Patent Application No. 201080024662.2, 17 pages.
Response filed Mar. 3, 2015 to 2nd Office Action mailed Dec. 19, 2014 from China Patent Application No. 201080024662.2, 12 pages.
First Office Action mailed Nov. 28, 2013 from China Patent Application No. 201080023822.1, 12 pages.
Examination Report mailed Apr. 4, 2012, from European Patent Application No. 10781358.6, 7 pages.

(56) References Cited

OTHER PUBLICATIONS

Response filed Jul. 31, 2012 to Examination Report mailed Apr. 4, 2012 from European Patent Application No. 10781358.6, 16 pages.
Response filed Jun. 3, 2015 to Examination Report mailed Feb. 5, 2015 from European Patent Application No. 10781358.6, 17 pages.
Examination Report mailed Feb. 5, 2015 from European Patent Application No. 10781358.6, 5 pages.
Examination Report mailed Feb. 25, 2013 from European Patent Application No. 10781358.6, 5 pages.
Response filed May 22, 2013 to Examination Report mailed Feb. 25, 2013 from European Patent Application No. 10781358.6, 15 pages.
Supplementary Search Report mailed Jan. 20, 2012 from European Patent Application No. 10781358.6, 2 pages.
Voluntary Amendment filed May 17, 2013 from Japan Patent Application No. 2012-513344, 7 pages.
Response and Amendment filed Aug. 6, 2014 to Office Action mailed Mar. 11, 2014, from Japan Patent Application No. 2012-513344, 11 pages.
Office Action mailed Oct. 7, 2014 from Japan Patent Application No. 2012-513344, 8 pages.
Office Action mailed Mar. 11, 2014 from Japan Patent Application No. 2012-513344, 6 pages.
Response filed Jan. 6, 2015 to Office Action mailed Oct. 7, 2014, from Japanese Patent Application No. 2012-513344, 9 pages.
Amendment filed Apr. 30, 2015 from Korea Patent Application No. 10-2011-7028254, 32 pages.
Non-Final Office Action mailed Jul. 15, 2015 from U.S. Appl. No. 14/221,056, 18 pages.
Request for Examination with Voluntary Amendment filed Apr. 23, 2015 from Canada Patent Application No. 2,759,957, 28 pages.
Examination Report mailed Sep. 23, 2015 from European Patent Application No. 10781357.8, 3 pages.
Second Office Action mailed Dec. 19, 2014 from China Patent Application No. 201080024662.2, 15 pages.
Non-Final Office Action mailed Oct. 6, 2011 from U.S. Appl. No. 12/578,608, 18 pages.
Response filed Feb. 6, 2012 to Non-Final Office Action mailed Oct. 6, 2011 from U.S. Appl. No. 12/578,608, 11 pages.
Final Office Action mailed Mar. 22, 2012 from U.S. Appl. No. 12/578,608, 24 pages.
Applicant Initiated Interview Summary mailed Jun. 14, 2012 from U.S. Appl. No. 12/578,608, 3 pages.
Response filed Jul. 19, 2012 to Final Office Action mailed Mar. 22, 2012 from U.S. Appl. No. 12/578,608, 11 pages.
Non-Final Office Action mailed Nov. 22, 2013 from U.S. Appl. No. 12/578,608, 20 pages.
Response filed Apr. 1, 2014 to Non-Final Office Action mailed Nov. 22, 2013 from U.S. Appl. No. 12/578,608, 11 pages.
Final Office Action mailed Jun. 25, 2014 from U.S. Appl. No. 12/578,608, 22 pages.
Response filed Oct. 30, 2014 to Final Office Action mailed Jun. 25, 2014 from U.S. Appl. No. 12/578,608, 10 pages.
Non-Final Office Action mailed Mar. 27, 2015 from U.S. Appl. No. 12/578,608, 22 pages.
Response filed Jul. 2, 2015 to Non-Final Office Action mailed Mar. 27, 2015 from U.S. Appl. No. 12/578,608, 11 pages.
Request for Examination and Voluntary Amendment filed Aug. 20, 2013 from Japan Patent Application No. 2012-533293, 8 pages.
Notice of Allowance mailed Sep. 12, 2014 from Japan Patent Application No. 2012-533293, 4 pages.
Request for Examination and Voluntary Amendment filed Sep. 9, 2015 from Korea Patent Application No. 10-2012-7009062, 19 pages.
Examination Report mailed Oct. 7, 2014 from European Patent Application No. 14173698.3, 5 pages.
Search Report mailed Sep. 24, 2014 from European Patent Application No. 14173698.3, 3 pages.
Examination Report mailed Oct. 17, 2014 from European Patent Application No. 14173710.6, 5 pages.
Search Report mailed Oct. 7, 2014 from European Patent Application No. 14173710.6, 3 pages.
First Office Action mailed Jan. 6, 2015 from China Patent Application No. 201180017112.2, 18 pages.
Intention to Grant mailed Nov. 6, 2014 from European Patent Application No. 14173698.3, 47 pages.
Office Action mailed Jan. 27, 2015 from Japan Patent Application No. 2013-503779, 4 pages.
Response filed Oct. 23, 2014 to Examination Report mailed Oct. 7, 2014 from European Patent Application No. 14173636.3, 13 pages.
Non-Final Office Action mailed Dec. 17, 2012 from U.S. Appl. No. 12/753,913, 18 pages.
Response filed Apr. 17, 2013 to Non-Final Office Action mailed Dec. 17, 2012 from U.S. Appl. No. 12/753,913, 14 pages.
Final Office Action mailed Jul. 25, 2013 from U.S. Appl. No. 12/753,913, 20 pages.
Response filed Oct. 25, 2013 to Final Office Action mailed Jul. 25, 2013 from U.S. Appl. No. 12/753,913, 13 pages.
Non-Final Office Action mailed Feb. 26, 2015 from U.S. Appl. No. 12/753,913, 22 pages.
Response filed Jun. 4, 2015 to Non-Final Office Action mailed Feb. 26, 2015 from U.S. Appl. No. 12/753,913, 12 pages.
Final Office Action mailed Jun. 30, 2015 from U.S. Appl. No. 12/753,913, 22 pages.
Response filed Sep. 8, 2015 to Final Office Action mailed Jun. 30, 2015 from U.S. Appl. No. 12/753,913, 10 pages.
Notice of Allowance and Examiner Initiated Interview Summary mailed Oct. 7, 2015 from U.S. Appl. No. 12/753,913, 10 pages.
"Green IT," retrieved at <<http://www-03.ibm.com/systems/greendc/>>, retrieved on Mar. 29, 2010, IBM Corporation, Armonk, NY, 3 pages.
Costa et al., "Why Should We Integrate Services, Servers, and Networking in a Data Center?", Proceedings of the 1st ACM Workshop on Research on Enterprise Networking, 2009, pp. 111-117, 7 pages.
Hernandez, Pedro, "Startups Go Wireless for Data Center Energy Management," retrieved at <<http://earth2tech.com/2009/09/08/startups-go-wireless-for-data-center-energy-managemenU>> on Mar. 29, 2010, Earth2Tech, Sep. 8, 2009, 3 pages.
Kandula et al., "Flyways to De-Congest Data Center Networks," retrieved at <<http://conferences.sigcomm.org/hotnets/2009/papers/hotnets2009-final112.pdf>>, HotNets 2009, 6 pages.
Ohara, Dave, "Build a Green Datacenter," retrieved at <<http://technet.microsoft. com/en-us/magazine/2009.gr.datacenter.aspx>> on Mar. 29, 2010, TechNet Magazine, Oct. 2007, 6 pages.
Ramachandran et al., "60 GHz Data-Center Networking: Wireless Worry less?," retrieved at <<http://www.nec-labs. com/-kishore/papers/60GHz-DC.pdf>>, NEC Technical Report, Jul. 14, 2008, 11 pages.
Wexler, Joanie, "Wireless helps hone data center efficiencies," retrieved at <<http://www.networkworld.com/newsletters/wireless/2009/102609wireless1.html>>, Network World, Oct. 23, 2009, 2 pages.
International Search Report and Written Opinion mailed Nov. 29, 2011 from PCT Patent Application No. PCT/US2011/030050, 8 pages.
Notice of Allowance and Examiner Initiated Interview Summary mailed Oct. 14, 2015 from U.S. Appl. No. 12/578,608, 18 pages.
Response filed Oct. 27, 2015 to the International Search Report and Written Opinion mailed Jul. 7, 2015 from PCT Patent Application No. PCT/US2015/021124, 19 pages.
Intention to Grant mailed Sep. 30, 2015 from European Patent Application No. 10781358.6, 55 pages.
Applicant Initiated Examiner Interview and Response filed Oct. 15, 2015 to Non-Final Office Action mailed Jul. 15, 2015 from U.S. Appl. No. 14/221,056, 19 pages.
Farinacci, et al., "Locator/ID Separation Protocol (LISP)," Internet Engineering Task Force, IETF, InternetSociety, Geneva, Switzerland, May 28, 2009, 62 pages.
"switch," published Oct. 2000. downloaded from <<http://searchtelecom.techtarget.com/definition/switch?vgnextfmt=print>> on Sep. 28, 2011, 2 pages.

(56) References Cited

OTHER PUBLICATIONS

Response filed Oct. 26, 2015 to Communication under R. 71(3) EPC from European Patent Application No. 10781358.6, 15 pages.
Wundsam, et al., "OFRewind: Enabling Record and Replay Troubleshooting for Networks," in Proceedings of the USENIX Annual Technical Conference, Jun. 2011, 14 pages.
Zeng, et al., "Automatic Test Packet Generation," in Proceedings of the 8th International Conference on Emerging Networking Experiments and Technologies, Dec. 2012, 12 pages.
Handigol, et al., "I Know What Your Packet Did Last Hop: Using Packet Histories to Troubleshoot Networks," In Proceedings of the 11th USENIX Symposium on Networked Systems Design and Implementation (NSDI '14), Apr. 2014, 16 pages.
Wu, et al., "Virtual Network Diagnosis as a Service," in Proceedings of the 4th Annual Symposium on Cloud Computing, Oct. 2013, 15 pages.
Shenker, Scott, "The Future of Networking, and the Past of Protocols," slide presentation, Open Networking Summit, Oct. 2011, 30 pages.
Snoeren, et al., "Hash-Based IP Traceback," in Proceedings of the ACM SIGCOMM Conference on Applications, Technologies, Architectures, and Protocols for Computer Communication, Aug. 2001, 12 pages.
Sekar, et al., "CSAMP: A System for Network-Wide Flow Monitoring," in Proceedings of the 5th USENIX Symposium on Networked Systems Design and Implementation, Apr. 2008, 14 pages.
Savage, et al., "Practical Network Support for IP Traceback," in Proceedings of the ACM SIGCOMM Conference on Applications, Technologies, Architectures, and Protocols for Computer Communication, Aug. 2000, 12 pages.
Rosenblum, et al., "The Design and Implementation of a Log-Structured File System," in ACM Transactions on Computer Systems, vol. 10, Issue 1, Feb. 1992, 27 pages.
McCanne, et al., "The BSD Packet Filter: A New Architecture for User-Level Packet Capture," in Proceedings of the USENIX Winter Conference, Jan. 1993, 12 pages.
Mai, et al., "Debugging the Data Plane with Anteater," in Proceedings of the ACM SIGCOMM Conference on Applications, Technologies, Architectures, and Protocols for Computer Communications, Aug. 2011, 12 pages.
Lantz, et al., "A Network in a Laptop: Rapid Prototyping for Software-Defined Networks," in Proceedings of the 9th ACM SIGCOMM Workshop on Hot Topics in Networks, Oct. 2010, 6 pages.
Kobayashi, et al., "Maturing of OpenFlow and Software-defined Networking through deployments," in Computer Networks, vol. 61, Mar. 2014, 25 pages.
Khurshid, et al., "VeriFlow: Verifying Network-Wide Invariants in Real Time," in Proceedings of the 10th USENIX Conference on Networked Systems Design and Implementation, Apr. 2013, 13 pages.
Khurshid, et al., "VeriFlow: Verifying Network-Wide Invariants in Real Time," in Proceedings of 1st Workshop on Hot Topics in Software Defined Networks, Aug. 2012, 6 pages.
Handigol, Nikhil Ashok, "Using Packet Histories to Troubleshoot Networks," Thesis of Doctor of Philosophy, Stanford University, Stanford, CA, Jun. 2013, 118 pages.
Santos, et al., "Multi-Hop Packet Tracking for Experimental Facilities," in Proceedings of the ACM SIGCOMM Conference on Applications, Technologies, Architectures, and Protocols for Computer Communications, Aug. 2010, 2 pages.
Yu, et al., "Profiling Network Performance for Multi-Tier Data Center Applications," in Proceedings of the 8th USENIX Conference on Networked Systems Design and Implementation, Mar. 2011, 14 pages.
"Warding Off Espionage with Network Forensics," Available at <<http://blog.wildpackets.com/tag/data-capture>>, WildPackets: Network Analysis and Monitoring Blog, published on Aug. 4, 2010, 2 pages.
Zou, et al., "PktTrace: A Packet Life-Cycle Tracking Tool for Network Services in a Software-Defined Data Center," available at <<http://www.cc.gatech.edu/grads/h/hzou7/papers/Pkt-Trace_VMTJF.pdf>>, in VMware Technical Journal Summer 2014 (VMTJ'14), retrieved on Sep. 3, 2014, 6 pages.
"Configuring ERSPAN," available at <<http://www.cisco.com/c/en/us/td/docs/switches/datacenter/sw/5_x/nx-os/system_management/configuration/guide/sm_nx_os_cg/sm_erspan.html>>, retrieved on Sep. 3, 2014, Cisco Systems, Inc., San Jose, CA, 9 pages.
"How to use Wireshark to capture a packet trace," available at <<http://www.novell.com/support/kb/doc.php?id=3892415>>, Novell, Inc., Provo, Utah, published on Feb. 14, 2014, 3 pages.
Arefin, et al., "Scaling Data-Plane Logging in Large Scale Networks," in Proceedings of MILCOM, Nov. 2011, 7 pages.
Argyraki, et al., "Providing Packet Obituaries," in Proceedings of the Third Workshop on Hot Topics in Networks, Nov. 2004, 6 pages.
Benson, et al., "Network Traffic Characteristics of Data Centers in the Wild," in Proceedings of the 10th ACM SIGCOMM Conference on Internet Measurement, Nov. 2010, 14 pages.
Corbet, Jonathan, "A JIT for Packet Filters," available at <<http://lwn.net/Articles/437981/>>, published on Apr. 12, 2011, 6 pages.
Canini, et al., "A NICE Way to Test Openflow Applications," in Proceedings of the 9th USENIX Conference on Networked Systems Design and Implementation, Apr. 2012, 14 pages.
"Configuring Local SPAN, RSPAN, and ERSPAN," available at <<http://www.cisco.com/c/en/us/td/docs/switches/lan/catalyst6500/ios/12-2SX/configuration/guide/book/span.pdf>>, retrieved on Sep. 3, 2014, Cisco IOS Software Configuration Guide, Release 12.2SX, OL-13013-06, Chapter 68, Cisco Systems, Inc., San Jose, CA, 36 pages.
Claise, B. (Ed.), "Specification of the IP Flow Information Export (IPFIX) Protocol for the Exchange of IP Traffic Flow Information," available at <<http://tools.ietf.org/pdf/rFc5101.pdf>>, Network Working Group, Request for Comments 5101, Jan. 2008, 63 pages.
Cox, Russ, "Regular Expression Matching: the Virtual Machine Approach," available at <<http://swtch.com/~rsc/regexp/regexp2.html>>, published on Dec. 2009, 23 pages.
"cPacket Networks, Products Overview," available at <<http://cpacket.com/products/>>, retrieved Jun. 2014, cPacket Networks, Mountain View, CA, 3 pages.
Cranor, et al., "Gigascope: A Stream Database for Network Applications," in Proceedings of the ACM SIGMOD International Conference on Management of Data, Jun. 2003, 5 pages.
Dean, et al., "An Algebraic Approach to IP Traceback," in ACM Transactions on Information and System Security, vol. 5, Issue 2, May 2002, 19 pages.
Duffield, Nick, "Fair Sampling Across Network Flow Measurements," in Proceedings of the 12th ACM Sigmetrics/Performance Joint International Conference on Measurement and Modeling of Computer Systems, Jun. 2012, 12 pages.
Duffield, et al., "Trajectory Sampling for Direct Traffic Observation," in IEEE/ACM Transactions on Networking, vol. 9, Issue 3, Jun. 2001, 13 pages.
Emulex Corporation home page, available at <<http://www.endace.com/>>, retrieved on Sep. 3, 2014, Emulex Corporation, Costa Mesa, CA, 2 pages.
Fonseca, et al., "X-Trace: A Pervasive Network Tracing Framework," in Proceedings of the 4th USENIIX Conference on Networked Systems Design & Implementation, Apr. 2007, 14 pages.
"Intel® Ethernet Switch FM5000/FM6000 Series," available at <<http://www.intel.com/content/www/us/en/switch-silicon/ethernet-switch-fm5000-fm6000-series.html>>, retrieved on Sep. 3, 2014, Intel Corporation, Santa Clara, CA , 3 pages.
Gigamon home page, available at <<http://www.gigamon.com/>>, retrieved on Sep. 3, 2014, Gigamon Inc., Santa Clara, CA, 3 pages.
Gude, et al., "NOX: Towards an Operating System for Networks," in ACM SIGCOMM Computer Communication Review, vol. 38, Issue 3, Jul. 2008, 6 pages.
Handigol, et al., "Where is the Debugger for my Software-Defined Network?," in Proceedings of the 1st Workshop on Hot Topics in Software Defined Networks, Aug. 2012, 6 pages.

(56) References Cited

OTHER PUBLICATIONS

Jacobson, V., "Compressing TCP/IP Headers for Low-Speed Serial Links," available at <<http://tools.ietf.org/pdf/rfc1144.pdf>>, Network Working Group, Request for Comments 1144, Feb. 1990, 45 pages.
Kazemian, et al., "Real Time Network Policy Checking Using Header Space Analysis," in Proceedings of the 10th USENIX Conference on Networked Systems Design and Implementation, Apr. 2013, 13 pages.
Kazemian, et al., "Header Space Analysis: Static Checking for Networks," in Proceedings of the 9th USENIX Conference on Networked Systems Design and Implementation, Apr. 2012, 14 pages.
"LBNL/ICSI Enterprise Tracing Project: Overview," available at <<http://www.icir.org/enterprise-tracing/Overview.html>>, Lawrence Berkeley National Laboratory and ICSI, published on Jul. 30, 2013, 1 page.
"NEC IP8800 Open Flow Networking," available at <<http://support.necam.com/pflow/ip8800/>>, NEC Corporation, Minato, Tokyo, 1 page.
Zhang, Ming, "Switch-based Load Balancer," U.S. Appl. No. 14/221,056, filed Mar. 20, 2014, 65 pages.
Net Optics home page, available at <<http://www.netoptics.com/>>, retrieved on Sep. 3, 2014, Net Optics, Inc., Santa Clara, CA, 1 page.
"Open vSwitch: An Open Virtual Switch," available at <<http://openvswitch.org/>>, retrieved on Sep. 3, 2014, 1 page.
Phaal, et al., "sFlow Version 5," available at <<http://sflow.org/sflow_version_5.txt>>, published Jul. 2004, 47 pages.
"The POX Controller," available at <<https://github.com/noxrepo/pox>>, published on Oct. 14, 2013, 2 pages.
Heller, Brandon, "RipL-POX (Ripcord-Lite for POX): A simple network controller for Open Flow-based data centers," available at <<https://github.com/brandonheller/riplpox>>, published on Jun. 21, 2013, 2 pages.
Splunk Inc. home page, available at <<http://www.splunk.com/>>, retrieved on Sep. 3, 2014, Splunk Inc., San Francisco, CA, 2 pages.
"The CAIDA UCSD Anonymized Internet Traces 2012 Dataset," available at <<http://www.caida.org/data/passive/passive_2012_dataset.xml>>, Center for Applied Internet Data Analysis, Jul. 2014, 2 pages.
Rekhter (Ed.), et al., "A Border Gateway Protocol 4 (BGP-4)," available at <<http://tools.ietf.org/pdf/rfc4271.pdf>>, Network Working Group, Request for Comments 4271, Jan. 2006, 104 pages.
Farinacci, et al., "Generic Routing Encapsulation (GRE)," available at <<http://tools.ietf.org/pdf/rfc2784.pdf>>, Network Working Group, Request for Comments 2784, Mar. 2000, 9 pages.
Thaler, et al., "Multipath Issues in Unicast and Multicast Next-Hop Selection," available at <<http://tools.ietf.org/pdf/rfc2991.pdf>>, Network Working Group, Request for Comments 2991, Nov. 2000, 9 pages.
Amendment filed Mar. 1, 2017 from Chinese Patent Application No. 201580015228.0, 17 pages.
Second Written Opinion mailed Apr. 24, 2017 from PCT Patent Application No. PCT/US2016/031079, 4 pages.
Response to Telephone Interview filed Mar. 8, 2016 from China Patent Application No. 201080024662.2, 14 pages.
Notice on Grant mailed Feb. 25, 2016 from China Patent Application No. 201180017112.2, 7 pages.
Response filed Feb. 17, 2016 to the Fourth Office Action mailed Dec. 3, 2015 from China Patent Application No. 201080024662.2, 13 pages.
Response filed Jan. 14, 2016 to the Examination Report mailed Sep. 23, 2015 from European Patent Application No. 10781357.8, 14 pages.
Notice of Allowance mailed Nov. 24, 2015 from U.S. Appl. No. 12/578,608, 5 pages.
Final Office Action mailed Nov. 30, 2015 to U.S. Appl. No. 14/221,056, 26 pages.
Response filed Dec. 9, 2015 to the Second Office Action mailed Sep. 24, 2015 from China Patent Application No. 201180017112.2, 12 pages.
First Office Action mailed Aug. 16, 2016 from Japanese Patent Application No. 2015-203787, 13 pages.
Examiner Interview Summary mailed Sep. 22, 2016 from Canadian Patent Application No. 2,759,957, 2 pages.
Final Office Action mailed Aug. 12, 2016 from U.S. Appl. No. 14/221,056, 31 pages.
International Preliminary Report on Patentability mailed Jun. 15, 2016 from PCT Patent Application No. PCT/US2015/021124, 8 pages.
Final Office Action mailed Jun. 14, 2016 from Korea Patent Application No. 10-2011-7028169, 9 pages.
Examination Report mailed Oct. 7, 2014 from European Patent Application No. 14173636.3, 5 pages.
Response filed Apr. 18, 2016 to the Office Action mailed Feb. 16, 2016 from Korea Patent Application No. 10-2011-7028254, 39 pages.
Notice on Grant mailed Mar. 23, 2016 from China Patent Application No. 201080024662.2, 7 pages.
Notice of Allowance mailed Mar. 15, 2016 from U.S. Appl. No. 12/578,608, 17 pages.
Non-Final Office Action mailed Feb. 16, 2016 from U.S. Appl. No. 14/475,927, 51 pages.
Office Action mailed Feb. 16, 2016 from Korea Patent Application No. 10-2011-7028254, 10 pages.
Notice of Allowance mailed Mar. 2, 2016 from U.S. Appl. No. 12/753,913, 93 pages.
NEC ProgrammableFlow Technical Support, retrieved Jun. 16, 2014 at <<http://support.necam.com/pflow/legacy/p8800/>>, 1 page.
Response filed Feb. 8, 2016 to Final Office Action mailed Nov. 30, 2015 from U.S. Appl. No. 14/221,056, 14 pages.
Applicant-Initiated Interview Summary mailed Oct. 15, 2015 from U.S. Appl. No. 14/221,056, 5 pages.
Response filed Oct. 15, 2015 to Non-Final Office Action mailed Jul. 15, 2015 from U.S. Appl. No. 14/221,056, 14 pages.
International Preliminary Report on Patentability mailed Oct. 9, 2012 from PCT Patent Application No. PCT/US11/30050, 4 pages.
Examination Report mailed Jul. 4, 2013 from European Patent Application No. 11766409.4, 6 pages.
Response filed Nov. 5, 2013 to Examination Report mailed Jul. 4, 2013 from European Patent Application No. 11766409.4, 20 pages.
Communication under Rule 71(3) EPC Intention to Grant mailed Dec. 16, 2013 from European Patent Application No. 11766409.4, 48 pages.
Response Filed May 21, 2015 to First Office Action from China Patent Application No. 201180017112.2, 16 pages.
Second Office Action mailed Sep. 24, 2015 from China Patent Application No. 201180017112.2, 6 pages.
"Wireless Gigabit Alliance," retrieved at <<http://wirelessgigabitalliance.org/>>, May 14, 2010, 1 page.
"WirelessHD," retrieved at <<http://wirelesshd.org/>>, Mar. 24, 2010, 1 page.
Barroso et al., "The Datacenter as a Computer—An Introduction to the Design of Warehouse-Scale Machines," Morgan & Claypool, 2009, 119 pages.
Dean et al., "MapReduce: Simplified Data Processing on Large Clusters," OSDI, 2004, 26 pages.
Ghemawat et al., "The Google File System," SOSP '03, Oct. 19-22, 2003, Bolton Landing, New York, 15 pages.
Guo et al., "Bcube: High Performance, Server-centric Network Architecture for Modular Data Centers," SIGCOMM '09, Aug. 17-21, 2009, Barcelona, Spain, 12 pages.
Kandula et al., "Walking the Tightrope: Response Yet Stable Traffic Engineering," SIGCOMM '05, Aug. 21-26, 2005, Philadelphia, PA, 12 pages.
SIBeam, "Benefits of 60 GHz," Sibeam Whitepapers, Nov. 2005, Retreived at <<https://www.google.com/?gws_rd=ssl#q=SiBeam%2C+%22The+Benefits+of+60+Hz%22>> on Aug. 24, 2015, 5 pages.

(56) References Cited

OTHER PUBLICATIONS

SIBeam, "A 4-GBPD Uncompressed Wireless HD A/V Transceiver Chipset," 2008 IEEE, 9 pages.
SIBeam, "60 GHz Architecture for Wireless Video Display" <<http://sibeam.com>>, Mar. 2006, 6 pages.
Smulders, "Exploiting the 60GHz Band for Local Wireless Multimedia Access: Prospects and Future Directions," IEEE Communications Magazine, Jan. 2002, 8 pages.
Van Winkle, William, "Beamforming: The Best WiFi You've Never Seen," Aug. 17, 2009, Retrieved at <<http://www.tomshardware.com/reviews/beamforming-wifi-ruckus,2390.html>> on Aug. 24, 2015, 19 pages.
"Event Tracing for Windows," retreived at <<http://msdn.microsoft.com/en-us/library/ms751538.aspx>>, Mar. 5, 2010, 3 pages.
Wells, Jonathan, "Multigigabit wireless connectivity at 70, 80 and 90 GHz," May 1, 2006, retrieved at http://mobiledevdesign.com/hardware_news/radio_multigigabit_wireless_connectivity/>> on Oct. 13, 2009, 8 pages.
U.S. Appl. No. 61/250,013 titled "Flyways in Data Centers," by Jitendra Padhye, filed Oct. 9, 2009, 18 pages.
International Preliminary Report on Patentability mailed Apr. 11, 2012 from PCT Patent Application No. PCT/US2010/051698, 6 pages.
Response filed Apr. 30, 2014 to Office Action and Search Report mailed Dec. 20, 2013 from China Patent Application No. 201080045182.4, 13 pages.
Response filed Oct. 21, 2014 to Office Action and Search Report mailed Aug. 7, 2014 from China Patent Application No. 201080045182.4, 13 pages.
Third Office Action mailed Jan. 13, 2015 from China Patent Application No. 201080045182.4, 9 pages.
Response filed Mar. 27, 2015 to Third Office Action mailed Jan. 13, 2015 from China Patent Application No. 201080045182.4, 12 pages.
Fourth Office Action mailed Jul. 13, 2015 from China Patent Application No. 201080045182.4, 7 pages.
Response filed Sep. 28, 2015 to Fourth Office Action mailed Jul. 13, 2015 from China Patent Application No. 201080045182.4, 13 pages.
Response filed Jul. 7, 2014 to Office Action mailed May 21, 2014 from Japan Patent Application No. 2012-533293, 9 pages.
Schoedel, Eric, "Gigabit Wireless for Network Connectivity", Educause Quarterly, vol. 32, No. 2, Nov. 2, 2009, Retrieved at <<http://www.educause.edu/EDUCAUSE+Quarterly/EDUCAUSEQuarterlyMagaA67:A75zineVolum/GigabitWirelessforNetworkConne/174585>>, 7 pages.
Robinson, Rick, "New Wireless 60 GHz Standard Promises Ultra-Fast Applications", Jan. 15, 2009, Retrieved at <<http://www.physorg.conn/news151258225.html>>on Oct. 13, 2009, 9 pages.
"Deploying 10 Gigabit Ethernet with Cisco Nexus 5000 Series Switches", May 2009, Retrieved on Oct. 13, 2009 at <<http://www.cisco.com/en/US/prod/collateral/switches/A67:A75ps9441/ps9670/white_paper_c27-489248_ns783_Networking_Solutions_White_Paper.html>>, 6 pages.
Mellor, Chris, "VirtenSys PCIe cloud Switch arrives", Feb. 24, 2009, Retrieved on Oct. 13, 2009 at <<http://www.theregister.co.uk/2009/02/24/vitensys_pcie_switch/>>, 2 pages.
"Advance Program", May 20, 2007, HSD 2007 Workshop on Interconnections within High Speed Digital Systems (HSD), 7 pages.
Handigol et al., "Plug-n-Serve: Load-Balancing Web Traffic using OpenFlow", 2009, Retrieved at <<http://conferences.sigcomm.org/sigcomm/2009/demos/sigcomm-pd-2009-final26.pdf>>, 2 pages.
"Sun Steps Up With Terascale Computing and On-Demand Capacity", 1994-2009, Retrieved on Oct. 13, 2009 at <<http://www.sun.com/aboutsun/media/features/terascale.html>>, 2 pages.
McGillicuddy, Shamus, "Cisco expands Nexus data center switch line with eye on virtualization", Jan. 28, 2009, Retrieved on Oct. 13, 2009 at <<http://searchnetworking.techtarget.com/news/article/0,289142,sid7_gci1346229,00.html#>>, 4 pages.
Untz et al., "On Demand Label Switching for Spontaneous Edge Networks", SIGCOMM '04 Workshops, Aug. 30-Sep. 3, 2004, pp. 35-42, 8 pages.
International Search Report mailed Jun. 16, 2011, PCT Patent Application No. PCT/US2010/051698, 11 pages.
Office Action and Search Report mailed Dec. 20, 2013 from China Patent Application No. 201080045182.4, 11 pages.
Office Action and Search Report mailed Aug. 7, 2014 from China Patent Application No. 201080045182.4, 15 pages.
Office Action mailed May 21, 2014 from Japan Patent Application No. 2012-533293, 8 pages.
Response filed Apr. 24, 2015 to First Office Action mailed Jan. 27, 2015 from Japan Patent Application No. 2013-503779, 9 pages.
Notice of Allowance mailed May 19, 2015 from Japan Patent Application No. 2013-503779, 2015, 6 pages.
Response filed Oct. 22, 2014 to Examination Report mailed Oct. 17, 2014 from European Patent Application No. 14173710.6, 14 pages.
Intention to Grant mailed Dec. 16, 2014 from European Patent Application No. 14173710.6, 5 pages.
Response filed Oct. 13, 2014 to Examination Report mailed Oct. 7, 2014 from European Patent Application No. 14173698.3, 14 pages.
Intention to Grant mailed Dec. 17, 2014 from European Patent Application No. 14173636.3, 5 pages.
Non-Final Office Action mailed Aug. 30, 2012 from U.S. Appl. No. 12/723,697, 12 pages.
Response filed Apr. 1, 2013 to Non-Final Office Action from U.S. Appl. No. 12/723,697, 13 pages.
Final Office Action mailed Jun. 6, 2013 from U.S. Appl. No. 12/723,697, 13 pages.
RCE/Response filed Aug. 1, 2013 to Final Office Action mailed Jun. 6, 2013 from U.S. Appl. No. 12/723,697, 17 pages.
Non-Final Office Action mailed Sep. 30, 2013 from U.S. Appl. No. 12/723,697, 17 pages.
Response filed Dec. 30, 2013 to Non-Final Office Action mailed Sep. 30, 2013, from U.S. Appl. No. 12/723,697, 15 pages.
Final Office Action mailed Apr. 10, 2014 from U.S. Appl. No. 12/723,697, 13 pages.
RCE/Response filed Jun. 26, 2014 to Final Office Action mailed Apr. 10, 2014 from U.S. Appl. No. 12/723,697, 19 pages).
Notice of Allowance mailed Nov. 14, 2014 from U.S. Appl. No. 12/723,697, 11 pages.
Shin et al., "On the Feasibility of Completely Wireless Data Centers", Technical Reports, Cornell University, 2011, 13 pages.
Dally et al., "Principles and Practices of Inconnection Networks," Morgan Kaufmann Publishers, 2004.
Jain, R., "The Art of Computer Systems Performance Analysis," John Wiley and Sons, Inc., 1991.
Response filed Jul. 15, 2016 to the Final Office Action mailed Jun. 14, 2016 from Korea Patent Application No. 10-2011-7028169, 21 pages.
International Search Report and Written Opinion mailed Jul. 13, 2016 from PCT Patent Application No. PCT/US2016/031079, 13 pages.
Notice of Allowance mailed Jun. 29, 2016 from U.S. Appl. No. 12/578,608, 10 pages.
PCT Demand filed Oct. 27, 2015 from PCT Patent Application No. PCT/US2015/021124, 19 pages.
Notice of Allowance mailed Aug. 16, 2016 from Korean Patent Application No. 10-2011-7028169, 8 pages.
Response filed Aug. 15, 2016 to the Examiner's Report mailed Jul. 15, 2016 from Canada Patent Application 2,763,032, 10 pages.
Non-Final Office Action mailed Aug. 26, 2016 from U.S. Appl. No. 14/475,927, 22 pages.
PCT Demand and Response filed Aug. 26, 2016 from PCT Patent Application No. PCT/US2016/031079, 20 pages.
Notice of Allowance mailed Sep. 26, 2016 from U.S. Appl. No. 12/578,608, 13 pages.
Notice of Allowance mailed Jul. 20, 2016 from Korea Patent Application No. 10-2011-7028254, 8 pages.
Second Written Opinion mailed Jul. 21, 2016 from PCT Patent Application No. PCT/US2015/047633, 8 pages.

(56) References Cited

OTHER PUBLICATIONS

Office Action mailed Jul. 15, 2016 from Canada Patent Application 2,763,032, 5 pages.
Fourth Office Action and Search Report mailed Dec. 3, 2015 from China Patent Application No. 201080024662.2, 11 pages.
Office Action mailed Jun. 16, 2015 from Japan Patent Application No. 2012-513344, 6 pages.
Notice of Allowance mailed Nov. 23, 2015 from U.S. Appl. No. 12/753,913, 8 pages.
International Search Report and Written Opinion mailed Nov. 18, 2015 from PCT Patent Application No. PCT/US2015/047633, 13 pages.
Response filed Apr. 12, 2016 to the Office Action mailed Feb. 22, 2016 from Canada Patent Application No. 2,759,957, 12 pages.
Intention to Grant mailed May 20, 2016 from European Patent Application No. 10781357.8, 40 pages.
Amendment/Response filed May 16, 2016 to the Non-Final Office Action mailed Feb. 16, 2016 from U.S. Appl. No. 14/475,927, 11 pages.
Response filed May 17, 2016 to the Non-Final Office Action mailed Apr. 7, 2016 from U.S. Appl. No. 14/221,056, 11 pages.
Non-Final Office Action mailed Apr. 7, 2016 from U.S. Appl. No. 14/221,056, 52 pages.
Supplemental Notice of Allowance mailed Mar. 24, 2016 from U.S. Appl. No. 12/753,913, 8 pages.
Second Written Opinion mailed Mar. 21, 2016 from PCT Patent Application No. PCT/US2015/021124, 7 pages.
Response and Demand filed Mar. 3, 2016 from PCT Patent Application No. PCT/US2015/047633, 15 pages.
Request for Examination with Voluntary Amendment filed Feb. 26, 2016 from Korea Patent Application No. 10-2012-7026167, 26 pages.
Voluntary Amendment filed Sep. 27, 2016 from Canadian Patent Application No. 2,759,957, 3 pages.
Certificate of Patent mailed Nov. 16, 2016 from Korean Patent Application No. 10-2011-7028169, 6 pages.
Office Action mailed Dec. 12, 2016 from Canadian Patent Application 2,763,032, 4 pages.
Response filed Nov. 22, 2016 to the Non-Final Office Action mailed Aug. 26, 2016 from U.S. Appl. No. 14/475,927, 13 pages
Final Office Action mailed Feb. 13, 2017 from U.S. Appl. No. 14/475,927, 24 pages.
International Preliminary Report on Patentability mailed Dec. 12, 2016 from PCT Patent Application No. PCT/US2015/047633, 9 pages.
Advisory Action, Examiner Initiated Interview Summary, and After Final Consideration Program Decision, mailed Mar. 1, 2016 from U.S. Appl. No. 14/221,056, 4 pages.
Office Action mailed Feb. 22, 2016 from Canada Patent Application No. 2,759,957, 5 pages.
Response filed Feb. 15, 2016 to the Preliminary Rejection mailed Dec. 13, 2015 from Korea Patent Application No. 10-2011-7028169, 16 pages.
Notice on Grant mailed Feb. 2, 2016 from China Patent Application No. 201080045182.4, 6 pages.
Decision to Grant mailed Oct. 13, 2016 from European Patent Application No. 10781357.8, 2 pages.
Communication pursuant to Rules 161(1) and 162 EPC mailed Oct. 27, 2016 from European Patent Application No. 15716216.5, 2 pages.
Response filed Jan. 12, 2017 to the First Office Action mailed Aug. 16, 2016 from Japanese Patent Application No. 2015-203787, 4 pages.
Response filed May 11, 2017 to the Final Office Action dated Feb. 13, 2017 from U.S. Appl. No. 14/475,927, 13 pages.
Non-Final Office Action dated Jun. 26, 2017 from U.S. Appl. No. 14/475,927, 29 pages.
International Preliminary Report on Patentability dated Aug. 9, 2017 from PCT Patent Application No. PCT/US2016/031079, 7 pages.
Response filed Jan. 19, 2017 to the Office Action dated Dec. 12, 2016 from Canadian Patent Application No. 2763032, 11 pages.

\* cited by examiner

MEASURING PERFORMANCE OF A NETWORK USING MIRRORED PROBE PACKETS

BACKGROUND

It is often difficult to determine the cause of failures and other anomalous events that occur within a network. This difficulty ensues from the large scale of many of these networks, the large amounts of traffic carried by these networks, and the variety of faults to which these networks are susceptible. Suboptimal performance of a network may result in loss of revenue and other negative consequences.

SUMMARY

Functionality is described herein for measuring the performance of a network, e.g., for the purpose of detecting anomalies in the network. In one implementation, the functionality operates by generating a probe packet and injecting the probe packet into the network. The probe packet is configured, using one or more layers of encapsulation, to target a particular network component in the network (such as a particular switch), or to target a particular collection of network components in the network (such as a collection of switches). A network component to which the probe packet is addressed operates by: (a) generating mirrored information associated with the probe packet, e.g., in the form of a mirrored packet; (b) providing the mirrored information to a collection and analysis (CA) system; (c) decapsulating the probe packet by removing its outermost header to produce a new probe packet; and (d) passing the new probe packet to a downstream network component (e.g., a downstream switch), in accordance with a destination address provided by the new probe packet.

In one implementation, the functionality relies on the mirrored information that has been collected by the CA system to detect various anomalies in the network, including, for instance dropped packets, latency-related problems, loop-related problems, load-balancing problems, etc.

The above approach can be manifested in various types of systems, devices, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a probe analysis system for measuring the performance of a network through the use of mirrored probe packets. Section B sets forth illustrative methods which explain the operation of the probe analysis system of Section A. Section C describes illustrative computing functionality that can be used to implement aspects of the features described in Sections A and B.

Figure 12:
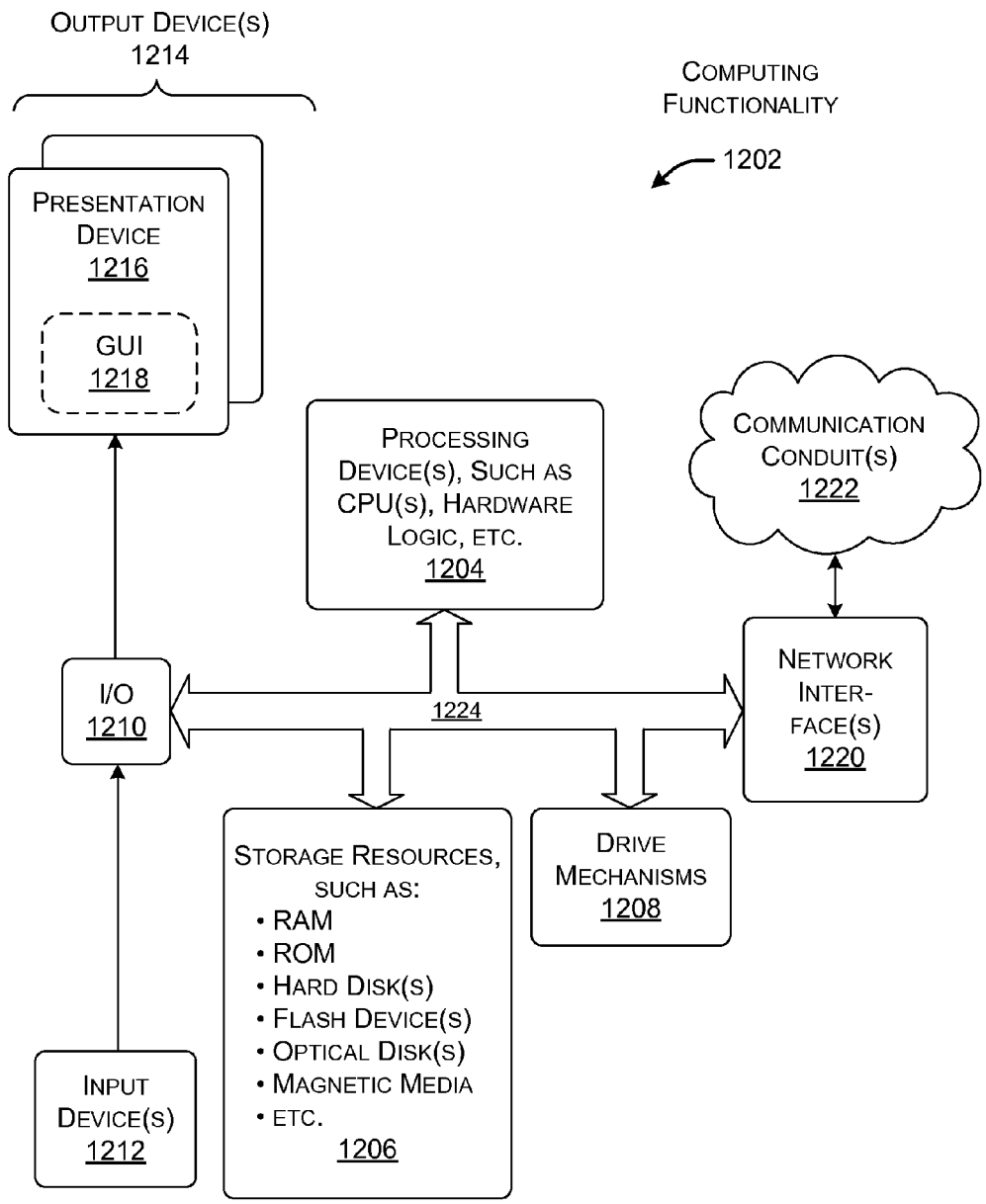
FIG. 12 shows illustrative computing functionality that can be used to implement aspects of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 12, to be described in turn, provides additional details regarding one illustrative physical implementation of software-driven features shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, in whatever manner implemented.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Probe Analysis System

A.1. Overview

Figure 1:
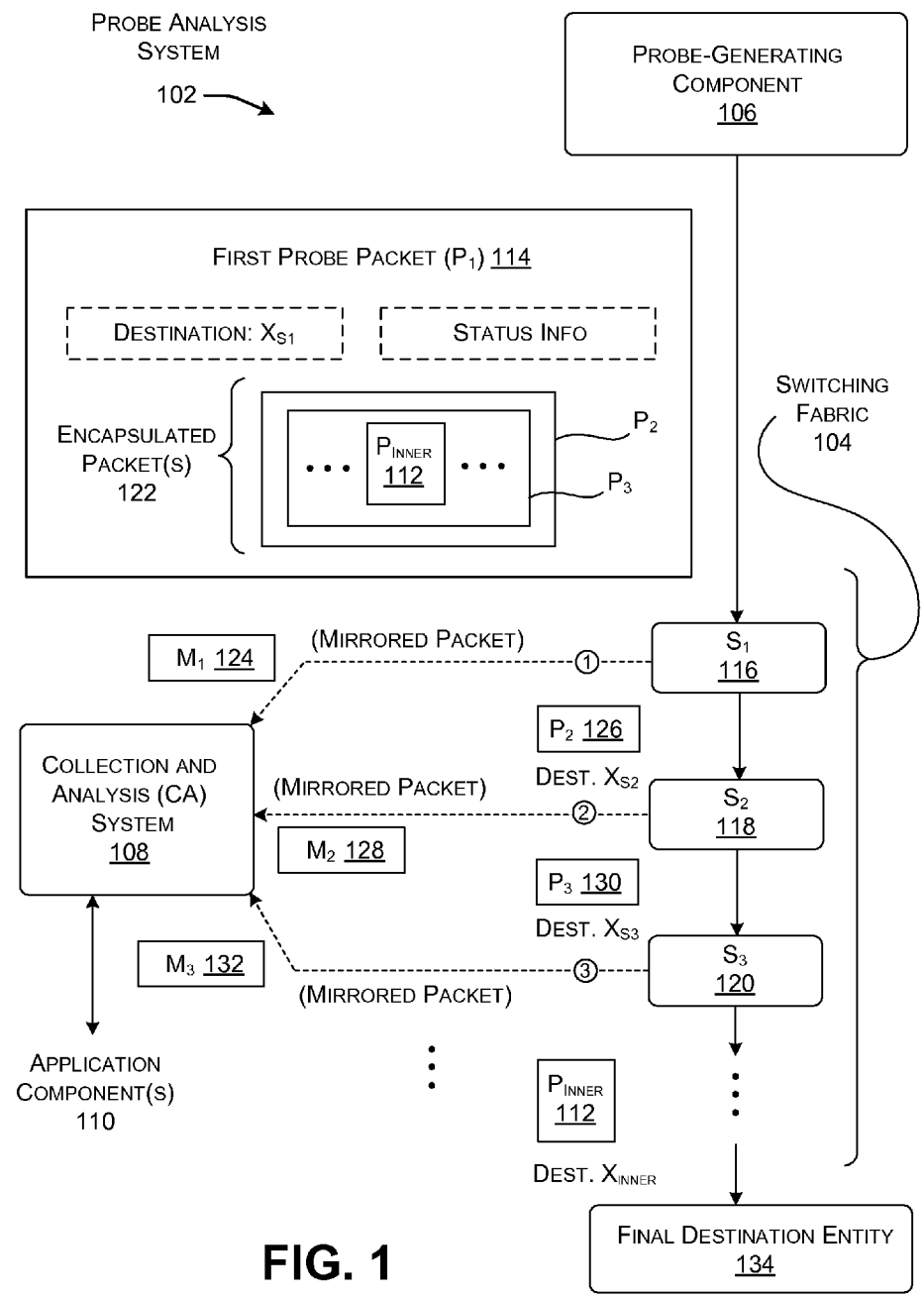
FIG. 1 shows an overview of a probe analysis system that uses probe packets to measure the performance a network.

FIG. 1 shows an overview of a probe analysis system 102 that uses probe packets to measure the performance of a network. The network may correspond to any environment in which computing devices are coupled together via a plurality of links. For example, the network may correspond to a data center, an enterprise system, etc. Alternatively, or in addition, the network may correspond to part of a wide area network (e.g., the Internet), a local area network, or some combination thereof.

The network includes a plurality of network components. The network components can include any of switches, routers, load-balancing mechanisms, source-point generators of information, end-point consumers of information, storage mechanisms, and so on. Any such device may be implemented in hardware, software, or any combination thereof. For example, a switch may be implemented using hardware (e.g., as an application specific integrated circuit (ASIC) device), software (e.g., as a virtual switch that runs on a software-driven computing device), or any combination thereof.

In whatever manner implemented, the network can be said to employ a switching fabric 104, a very small part of which is illustrated in FIG. 1. The switching fabric 104 represents any assortment of network components of any type(s) for routing packets through the network. To nevertheless facilitate explanation below, the switching fabric 104 will be described below in the simplified case in which its network components correspond to a collection of switches.

A packet refers to any unit of information. For example, a packet may correspond to an Internet Protocol (IP) packet having a header and a payload. The header provides metadata pertaining to the payload within predetermined fields. The switching fabric 104 may use any routing protocol to route packets through the switching fabric 104. For instance, the Border Gateway Protocol (BGP) may be used to define routes through the switching fabric 104.

The probe analysis system 102 includes plural main components that play different respective roles. As a first main component, the probe analysis system 102 includes a probe-generating component 106 that generates probe packets. A probe packet is constructed such that the routing functionality of the switching fabric 104 will route it to an identified switch, or route the probe packet (in its various manifestations) over a path that includes two or more identified switches. As will be described in detail below, the probe-generating component 106 directs the probe packet to one or more of these target switches by employing one or more layers of encapsulation.

As a second main component, the probe analysis system 102 includes packet processing functionality that is collectively implemented by all of the switches, or at least a subset of the switches. For example, each switch may perform its "normal" switching function by routing an incoming packet to a destination, based on an address specified in the incoming packet. In addition, each switch includes packet processing functionality that performs decapsulation and mirroring operations on probe packets. Decapsulation entails removing an outer header of a received probe packet to produce a new probe packet. Mirroring involves reproducing at least some content associated with the received probe packet (including any of its encapsulated "inner" packets).

More specifically, using its local instance of packet processing functionality, a particular switch may be configured to process a received probe packet by: (1) mirroring all or some of the content in the received probe packet to produce an instance of mirrored information; (2) sending the mirrored information to a collection and analysis (CA) system 108; (3) decapsulating the received probe packet to produce another probe packet (e.g., by removing its outermost encapsulation layer); and (4) providing the resultant decapsulated probe packet to a downstream destination (which may correspond to another switch, etc.). Subsection A.2 (below) provides additional information regarding one implementation of a representative switch.

In one implementation, a switch creates an instance of mirrored information by producing a mirrored packet, and then sends the mirrored packet to the CA system 108. The mirrored packet includes some or all of the content in the original received probe packet, before and/or after it is decapsulated. Note, however, that Subsection A.6 will describe other implementations of the "mirroring" operation. For example, in another case, the switch may capture information regarding a received probe packet by creating a timestamp and/or other metadata pertaining to the probe packet, which is not explicitly present in the probe packet as received. The switch may then embed the timestamp and/or other metadata in the probe packet itself or another packet. To nevertheless facilitate explanation, the immediately following explanation will emphasize the implementation in which a switch produces a mirrored packet by reproducing at least some information that is explicitly present in the received probe packet.

Note that the switch may come pre-equipped with the capability of performing decapsulation and mirroring in other contexts. For example, the switch may have native decapsulation capability to implement traditional packet tunneling. The probe analysis system 102 reprograms and repurposes this native capability to process probe packets in the manner summarized above, which is not a function performed by conventional switches.

As a third main component, the probe analysis system 102 includes the collection and analysis (CA) system 108. The CA system 108 receives the mirrored packets generated by the switches in the switching fabric 104 and performs various processing on those mirrored packets. For example, the CA system 108 can assemble groups of mirrored packets into respective traces and then store those traces. Each trace includes an ordered series of mirrored packets that have been generated by respective switches that have encountered a particular probe packet in its various manifestations, as it traverses the switching fabric 104. The CA system 108 can also generate and store summary information which reflects the performance of the network, e.g., as expressed in one or more counter values. The CA system 108 can also perform preliminary processing to detect anomalies in the network, and store information regarding those anomalies. Subsection A.4 (below) provides additional information regarding one implementation of the CA system 108.

As a fourth main component, the probe analysis system 102 can accommodate one or more application components 110 (referred to in the singular below for convenience). Each application may perform additional analysis based on the information that has been collected and stored by the CA system 108. For example, a first application component can perform analysis to determine the cause of packet drops. A packet drop occurs when a probe packet fails to reach its intended destination or fails to otherwise traverse its expected route. A second application component can analyze latencies on any link(s) in the network. A third application component can perform analysis with respect to looping behavior exhibited by the network. The network exhibits looping behavior when the route taken by a probe packet traverses the same switch at least twice. Still other applications are possible, such as applications that perform analysis with respect to load-balancing-related problems, protocol-related problems, and so on. Subsection A.5 (below) provides additional information regarding representative application components.

The probe analysis system 102 can also include other functional components, including a management component, to be described below with respect to FIG. 4.

Generally, note that the above-described allocation of different functions to different components (e.g., the probe-generating component 106, the switches in the switching fabric 104, the CA system 108, the application components, the manager component, etc.) represents just one implementation of the probe analysis system 102. In other cases, a single component can perform two or more of the main functions described above. In addition or alternatively, two or more components can perform any single main function described above.

From a high-level perspective, the probe analysis system 102 may operate in different operational phases. In one case, the probe analysis system 102 operates in a direct probing phase by generating a suite of probe packets and injecting those probe packets into the network. Different events may trigger the operation of the direct probing phase. For example, the probe analysis system 102 may periodically perform its direct probing operation (e.g., on a weekly, daily, or hourly basis, etc.) with respect to the entire network or a portion of the network. Alternatively, or in addition, the probe analysis system 102 may perform its direct probing operation when a fault has been detected in the network by any fault detection mechanism(s). In this case, the probe analysis system 102 can generate probe packets that are directed to a particular part of the network that is hypothesized to be misbehaving.

The probe analysis system 102 can also (optionally) operate in a preliminary investigation phase (which may be also referred to as a preliminary measurement phase). The probe analysis system 102 performs this task by passively mirroring "normal" network traffic packets that pass through the switches of the network to their respective intended destinations. Such normal packets may be termed preliminary-phase packets to distinguish them from the specifically configured probe packets. Each switch that processes a preliminary-phase packet determines whether a mirroring condition has been met; that decision, in turn, may be based on one or more packet-detection rules. If a mirroring condition is met, the switch mirrors the preliminary-phase packet to produce a preliminary-phase mirrored packet. The switch then passes the preliminary-phase mirrored packet to the CA system 108.

The CA system 108 may examine the preliminary-phase mirrored packets to determine whether there are any anomalies in the network, such as incidents of dropped packets, anomalous latencies, etc. If anomalies are detected, the probe analysis system 102 may then identify the general part(s) of the network that appear to be responsible for the anomalous behavior. At this juncture, the probe analysis system 102 may use the direct probing mode to determine the underlying cause of each anomaly discovered in the preliminary investigation mode.

The probe analysis system 102 can also use the direct probing mode to expand the information collected in the preliminary investigation phase. For example, the preliminary investigation phase may provide summary information (e.g., as expressed by one or more counter values) that describe the paths taken by a group of preliminary-phase packets as they traverse the network, but without storing the full traces that underlie the summary information. The probe analysis system 102 can generate full traces by re-injecting the group of packets into the network and then capturing the full traces for these packets.

To repeat, however, the preliminary investigation phase is optional; the probe analysis system 102 can perform the direct probing mode without first performing the preliminary investigation mode.

Different implementations of the probe analysis system 102 can automate the above-described operations to varying extents. In one case, the probe analysis system 102 performs all of its operations in a fully automated manner, without intervention from a human analyst. In other cases, the probe analysis system 102 performs one or more of its tasks under the direction of a human analyst. For example, a human analyst may manually examine the results of the preliminary investigation stage to determine or confirm the part(s) of the network that are misbehaving. The human analysis may then manually instruct the probe-generating component 106 to generate a suite of probe packets that target a particular part of the network, and to inject that suite of probe packets into the network.

FIG. 1 provides an overview of one manner in which the probe analysis system 102 processes a probe packet. First, the probe-generating component 106 generates (or otherwise provides) an innermost probe packet ($P_{inner}$) 112 which specifies an innermost destination address $X_{inner}$. The probe-generating component 106 then generates a first probe packet ($P_1$) 114 that provides a vehicle for passing the innermost probe packet ($P_{inner}$) to a particular initial switch in the network (e.g., switch $S_1$ 116). In other cases, the probe-generating component 106 may generate the first probe packet ($P_1$) 114 so that it passes along a path defined by two or more switches, such any of switches $S_1$ (116), $S_2$ (118), $S_3$ (120), etc.

To achieve the above result, the probe-generating component 106 can include a first destination address ($X_{S1}$) which directs the first probe packet $P_1$ 114 to the first switch $S_1$ 116. More specifically, in one implementation, the first destination address ($X_{S1}$) may identify the loopback IP address associated with the first switch $S_1$ 116. The first probe packet $P_1$ 114 also includes one or more nested encapsulated packets 122. For example, in its minimal form, the first probe packet $P_1$ 114 contains only a single encapsulated packet, corresponding to the innermost probe packet $P_{inner}$ 112. But in the example of FIG. 1, the first probe packet $P_1$ 114 includes a second probe packet $P_2$ that is nested in the first probe packet $P_1$ 114. The second probe packet $P_2$, in turn, includes a third probe packet $P_3$ that is nested in the second probe packet $P_2$, and so on. The innermost nested packet corresponds to the probe packet $P_{inner}$ 112.

The first probe packet $P_1$ 114 also includes status information that identifies it as a packet that should be mirrored by the switch to which it is directed (that is, switch $S_1$ 116). The status information, for instance, may be expressed as a prescribed parameter value provided in the header and/or body of the first probe packet $P_1$ 114. Although not explicitly shown, each of the encapsulated probe packets ($P_2$, $P_3$, ... $P_{inner}$) may include the same status information which identifies the packet as a packet to be mirrored by its receiving switch. In addition, the first probe packet $P_1$ 114 (and any of its encapsulated probe packets) may optionally include status information which distinguishes these packets from other kinds of packets (such as preliminary-phase packets).

Upon injecting the first probe packet $P_1$ into the network, the switching fabric 104 uses its routing functionality to direct the first probe packet $P_1$ 114 to the first switch $S_1$ 116, based on the destination address ($X_{S1}$) specified by the first probe packet $P_1$ 114. Upon receipt, the first switch $S_1$ 116 determines that it is a probe packet to be decapsulated and mirrored. For example, the first switch $S_1$ 116 can determine that the first probe packet $P_1$ 114 is a probe packet to be decapsulated (and not some other type of packet) by virtue of the fact that it receives the first probe packet $P_1$ 114 via its loopback IP address (and/or by consulting the status information in the first probe packet $P_1$ 114). The first switch $S_1$ 116 can determine that the first probe packet $P_1$ 114 is to be mirrored based on the status information specified by the first probe packet $P_1$ 114.

In response to the above determination, the first switch $S_1$ 116 generates a first mirrored packet $M_1$ 124 based on the first probe packet $P_1$ 114, and sends the first mirrored packet $M_1$ 124 to the CA system 108. The first switch S1 116 also decapsulates the first probe packet $P_1$ 114 by removing its outermost encapsulation, yielding the embedded second probe packet $P_2$ 126. Assume that the second probe packet $P_2$ 126 has a second destination address $X_{S2}$ that corresponds to the second switch $S_2$ 118, e.g., which corresponds to the loopback IP address associated with the second switch $S_2$ 118. The first switch $S_1$ 116 then routes the probe packet $P_2$ 126 to the second switch $S_2$ 118. The above explanation described the mirroring operation as occurring before the decapsulation operation; but in other cases, the decapsulation operation can precede the mirroring operation, or be performed at the same time as the mirroring operation.

The first switch $S_1$ 116 may produce the first mirrored packet $M_1$ 124 in different ways, corresponding to different respective implementations. In one case, the first switch $S_1$ 116 may produce the first mirrored packet $M_1$ 124 such that it contains a subset of information in first probe packet $P_1$ 114 as received, and/or a subset of information in the decapsulated second probe packet $P_2$ 126 that it produces, etc. For example, the first switch $S_1$ 116 may extract any information from the header and/or body of the received probe packet $P_1$ 114, and/or any information from the header(s) and/or body(ies) of any of its embedded probe packets (including the header and/or body of the its innermost probe packet $P_{inner}$ 112). In addition, the first switch $S_1$ 116 can optionally add information to the first mirrored packet $M_1$ 124 that it creates that is not explicitly present in the received probe packet $P_1$ 114. For example, the first switch $S_1$ 116 can generate metadata (e.g., timestamp information, error information, etc.) upon processing the first probe packet $P_1$ 114, and add that information to the first probe packet $M_1$ 124.

Upon receiving of the second probe packet $P_2$ 126, the second switch $S_2$ 118 performs the same actions as the first switch $S_1$ 116. That is, it: (1) generates a second mirrored packet $M_2$ 128; (2) provides the second mirrored packet $M_2$ 128 to the CA system 108; (3) decapsulates the second probe packet $P_2$ 126 to produce a third probe packet $P_3$ 130; and (4) passes the third probe packet $P_3$ 130 to the third switch $S_3$ 120. Similarly, the third switch $S_3$ 120: (1) generates a third mirrored packet $M_3$ 132; (2) provides the third mirrored packet $M_3$ 132 to the CA system 108; (3) decapuslates the third probe packet $P_3$ 130 to produce a fourth probe packet $P_4$ (not shown); and (4) passes the fourth probe packet $P_4$ to its specified destination. Eventually, the switching fabric 104 directs the original innermost probe packet $P_{inner}$ 112 to an intended final destination entity 134, which may correspond to a computing device, a switch, or some other component.

The example of FIG. 1 corresponds to just one manner of routing an innermost probe packet $P_{inner}$ 112 to a final destination entity. In other cases, the probe-generating component 106 constructs the first probe packet $P_1$ 114 such that it encapsulates the innermost probe packet $P_{inner}$ 112 in a single level of encapsulation. In that case, the first switch $S_1$ 116 decapsulates the first probe packet $P_1$ 114 to produce the innermost probe packet $P_{inner}$ 112, and the switching fabric 104 then routes the innermost probe packet $P_{inner}$ 112 to its intended destination based on the destination address $X_{inner}$ specified by the innermost probe packet $P_{inner}$ 112.

Figure 2:
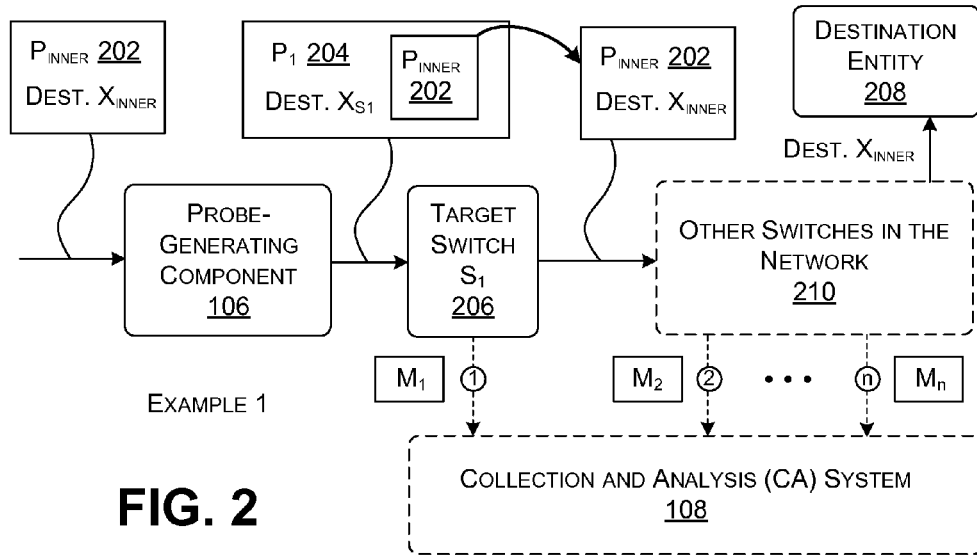
FIG. 2 shows one example of the operation of the probe analysis system of FIG. 1.

Advancing to FIG. 2, this figure illustrates the scenario described immediately above. Here, the probe-generating component 106 encapsulates an original inner packet $P_{inner}$ 202 in a first probe packet $P_1$ 204. The switching fabric 104 of the network routes the first probe packet $P_1$ 204 to a first switch $S_1$ 206. The first switch $S_1$ 206, upon receipt of the first probe packet $P_1$ 204: (1) generates a first mirrored packet $M_1$ and sends that packet to the CA system 108; (2) decapsulates the first probe packet $P_1$ to produce the innermost probe packet $P_{inner}$ 202; and (3) sends the innermost probe packet $P_{inner}$ 202 to whatever final destination entity 208 is associated with its destination address ($X_{inner}$), via zero, one or more intermediate switches 210 in the network.

Each of the other switches 210 that encounter the innermost probe packet $P_{inner}$ 202 along its path will generate a mirrored packet of the innermost probe packet $P_{inner}$ 202. However, at this juncture, the innermost probe packet $P_{inner}$ 202 contains no further embedded probe packet. As such, these downstream switches 210 will not perform the decapsulation function that is performed by the first switch 206. In one implementation, the innermost probe packet $P_{inner}$ 202 may include status information that indicates that it is a probe packet to be mirrored by any switch which encounters it. The innermost probe packet $P_{inner}$ 202 can also include a destination address ($X_{inner}$) that specifies the normal receiving address of the final destination entity 208, rather than a loopback IP address. In one implementation, a receiving switch will not attempt to decapsulate a received probe packet unless it receives it on its loopback IP address. Hence, any switch which processes the inner probe packet $P_{inner}$ 202 will know not to invoke the decapsulation operation.

Consider the following concrete instantiation of the example of FIG. 2. Assume that the preliminary investigation phase reveals that packets appear to be reaching the switch $S_1$ 206, but appear to be not reaching a next expected switch, e.g., switch $S_2$ (not shown). The preliminary investigation phase can reach this conclusion based on the fact that mirrored packets have been received from the switch $S_1$ 206, but not the switch $S_2$. In the direct probing phase, the probe-generating component 106 can generate the innermost probe packet $P_{inner}$ 202 having a destination address ($X_{inner}$) that specifies the address of switch $S_2$. The probe-generating component 106 then embeds $P_{inner}$ 202 in the first probe packet $P_1$ 204, and sets the address of the first probe packet $P_1$ 204 to correspond to the loopback IP address of the first switch $S_1$ 206. The probe-generating component 106 can then repeatedly send the first probe packet $P_1$ 204 into the switching fabric 104 to investigate whether packets are being consistently dropped from the second switch $S_2$. The probe-generating component 106 can also repeat this procedure for different downstream switches (with respect to switch $S_1$ 206) and/or for different parameter values within different respective fields of the header of the innermost probe packet $P_{inner}$ 202.

In another approach, the probe analysis system 102 can send the first probe packet $P_1$ 204 directly to the switch $S_2$ that is believed to be failing, with its inner probe packet $P_{inner}$ 202 specifying the destination address of the destination entity 208. Whatever particular approach is taken, the probe analysis system 102 provides a fine-grained technique for investigating the performance of a specific switch in the network by launching a probe packet directly to that switch.

Figure 3:
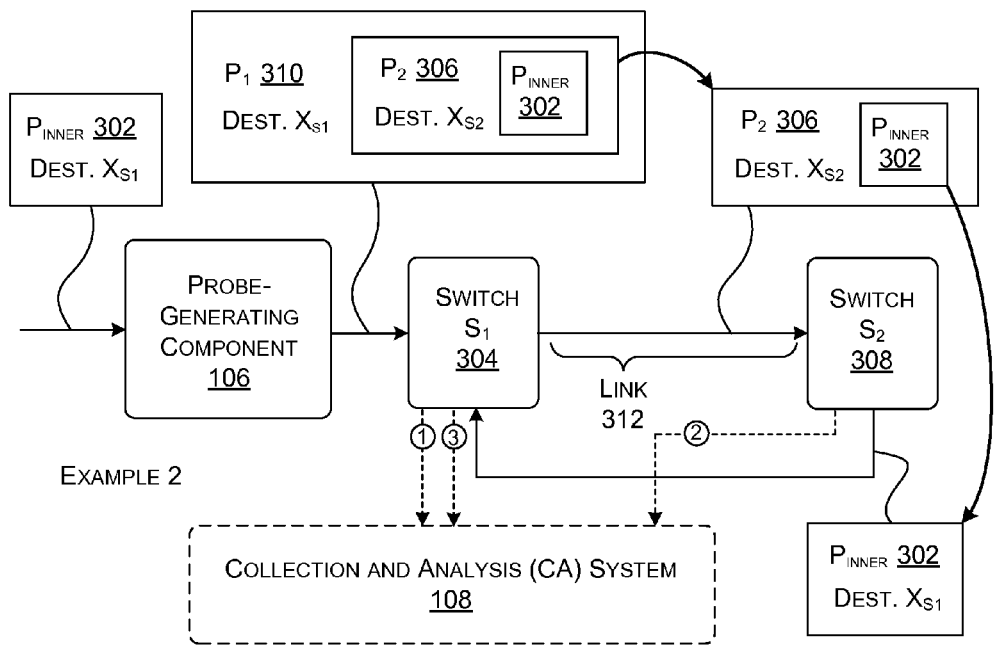
FIG. 3 shows another example of the operation of the probe analysis system of FIG. 1.

FIG. 3 shows another example of the operation of the probe analysis system 102 of FIG. 1. Here, the probe-generating component 106 produces (or receives) an innermost probe packet $P_{inner}$ 302 that specifies a destination address $X_{S1}$ associated with a first switch $S_1$ 304. The probe-generating component 106 then encapsulates the innermost probe packet $P_{inner}$ 302 in a second probe packet $P_2$ 306, which specifies a destination address $X_{S2}$ associated with a second switch $S_2$ 308. Finally, the probe-generating component 106 encapsulates the second probe packet $P_2$ 306 in an outermost first probe packet $P_1$ 310. The first probe packet $P_1$ 310 has the same destination address $X_{S1}$ as the innermost probe packet $P_{inner}$ 302, corresponding to the first switch $S_1$ 304.

The network first routes the first probe packet $P_1$ 310 to the first switch $S_1$ 304, based on the destination address $X_{S1}$ specified by the first probe packet $P_1$ 310. The first switch $S_1$ 304 then: (1) generates a first mirrored packet $M_1$ and sends the first mirrored packet $M_1$ to the CA system 108; (2) decapsulates the first probe packet $P_1$ 310 to produce the second probe packet $P_2$ 306; and (3) routes the second probe packet $P_2$ 306 to the second switch $S_2$ 308 (because the second probe packet $P_2$ 306 specifies the destination address $X_{S2}$ of the second switch $S_2$ 308).

The second switch 308, upon receipt of the second probe packet 306: (1) generates a second mirrored packet $M_2$ and sends the second mirrored packet $M_2$ to the CA system 108; (2) decapsulates the second probe packet $P_2$ 306 to produce the innermost probe packet $P_{inner}$ 302; and (3) routes the innermost probe packet $P_{inner}$ 302 back to the first switch $S_1$ 304 (because the innermost probe packet $P_{inner}$ 302 specifies the destination address $X_{S1}$ of the first switch $S_1$ 304). Finally, the first switch $S_1$ 304 again mirrors the received inner probe packet $P_{inner}$ 302 to produce a third mirrored packet $M_3$ and sends the third mirrored packet $M_3$ to the CA system 108.

In one concrete instantiation of the example of FIG. 2, the probe-generating component 106 can construct the above-described first probe packet $P_1$ 310 for the purpose of determining the roundtrip latency of a link 312 which couples the first switch $S_1$ 304 and the second switch $S_2$ 308. More specifically, the CA system 108 registers a first instance of time information ($t_1$) that indicates the time that it receives the first mirrored packet $M_1$, and a second instance of time information ($t_2$) that indicates the time that it receives the third mirrored packet $M_3$. The first mirrored packet $M_1$ and the third mirrored packet $M_3$ take the same path from the first switch $S_1$ 304 to the CA system 108. And a single clock reference, as maintained by the CA system 108, is used to calculate both instances of time information ($t_1$, $t_2$). Hence, the CA system 108 can reliably calculate the roundtrip latency time for the link 312 by subtracting the first instance of time information $t_1$ from the second instance of time information $t_2$.

Figure 4:
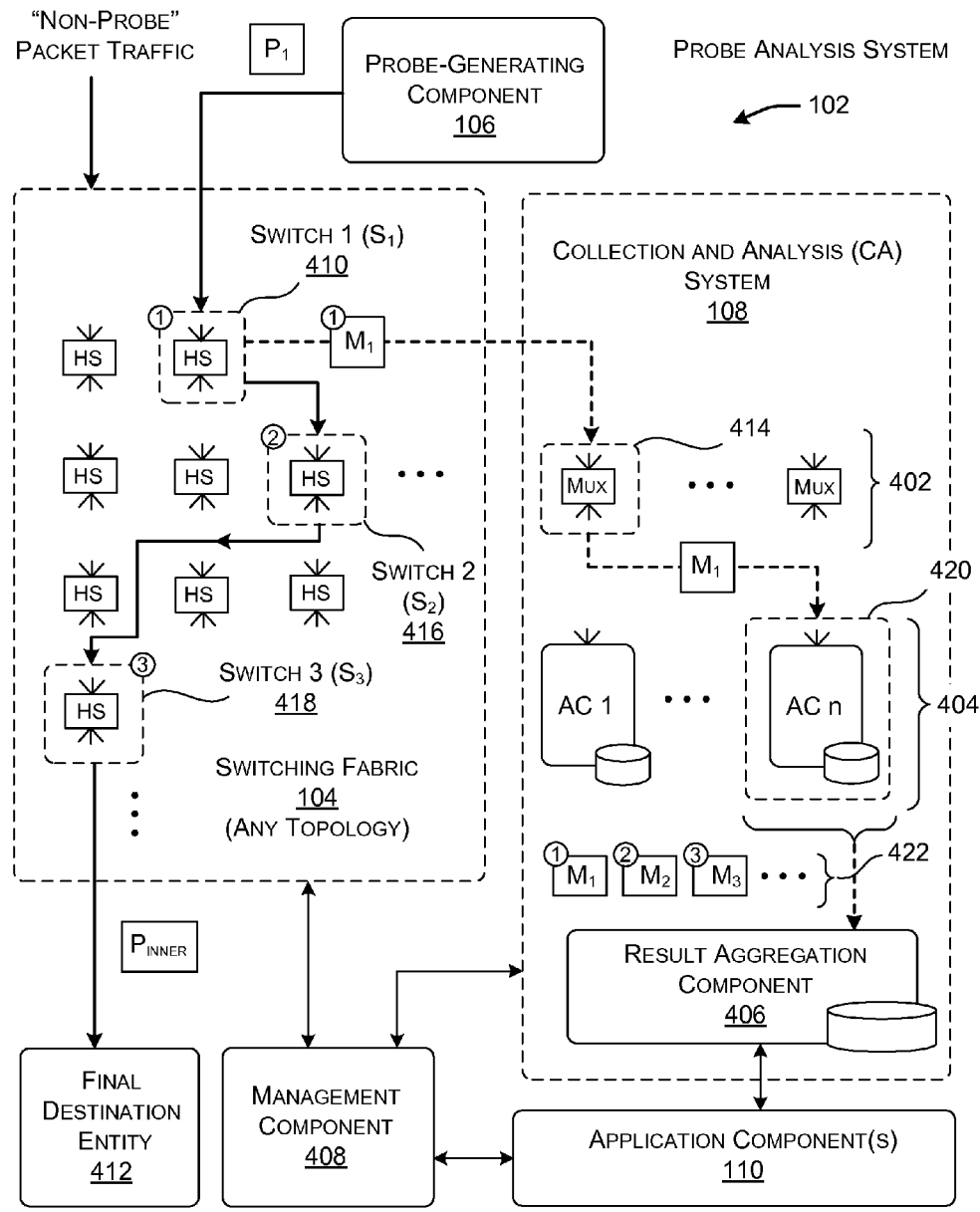
FIG. 4 shows one implementation of the probe analysis system of FIG. 1.

FIG. 4 shows one implementation of the probe analysis system 102 of FIG. 1. The probe analysis system 102 operates on any type of network described above, including, without limitation, a data center, an enterprise system, a portion of a wide area network, etc. The network includes the above-described switching fabric 104 including any assortment of network components (e.g., hardware-implemented switches, software-implemented switches, load balancers, routers, etc.). Generally, the switching fabric 104 is depicted in only high-level form in FIG. 1. In practice, the switching fabric 104 can have any topology. The topology determines the manner in which the switches are connected together.

As noted above, each switch, in whatever manner it is constructed, performs its "normal" function of routing an incoming packet, received from a source, to a destination, based on one or more routing considerations. The source may correspond to another "upstream" switch along a multi-hop path, or the ultimate source-point component which provides the packet. Similarly, the destination may correspond to another switch along the path, or a final end-point component to which the packet is addressed.

In addition, each switch includes packet processing functionality which performs mirroring and decapsulation functions on its received packets, under certain conditions. In other cases, each of at least some of the switches includes packet processing functionality to perform mirroring and decapsulation. With respect to the mirroring function, a switch generates a mirrored packet associated with a received packet, assuming that the received packet matches one or more packet-detection rules. With respect to the decapsulation function, the switch determines whether the received packet corresponds to an encapsulated probe packet (which, in turn, can be determined on the basis of whether the switch has received the probe packet on its loopback IP address). If decapsulation is invoked, the switch removes an outermost header associated with the probe packet, to produce a new probe packet. The switch then routes the new probe packet to a downstream entity (such as another switch).

As already described with reference to FIG. 1, each switch sends each mirrored packet that it creates to the CA system 108. More specifically, the switch may first send its mirrored packet to a multiplexer, selected from among a set of one or multiplexers 402. The chosen multiplexer may then send the mirrored packed to one of a set of analysis components (ACs) 404. The recipient analysis component can then use one or more processing engines to process the mirrored packet (along with other, previously received, mirrored packets). A result aggregation component 406 collects and aggregates the results generated by the individual ACs 404.

At least one application component 110 may interact with the CA system 108 to obtain the results of its analysis. The application component 110 may then perform any application-specific analysis on the results. In one case, the application component 110 may correspond to an analysis program that operates in an automatic manner, running on a computing device. In another case, the application component 110 may correspond to an analysis program running on a computing device under the direction of a human analyst.

A management component 408 may control any aspect of the probe analysis system 102. For example, the management component 408 can instruct the switches in the switching fabric 104 to load particular packet-detection rules, for use in identifying particular types of packets that are flowing through the switching fabric 104. The management component 408 can also interact with any analysis component, e.g., by sending instructions to an analysis component to change the nature of the processing that it performs. The management component 408 can also interact with the application component 110 in a manner to be described below.

Any module (or modules) of the probe analysis system 102 may implement the probe-generating component 106. For example, the management component 408 may implement the probe-generating component 106 as a part thereof. In this case, the management component 408 may automatically invoke the probe-generating component 106 on a periodic basis and/or on an event-driven basis (e.g., upon the detection of failures). In addition, the application component 110 may send a request to the management component 408, asking it to create a particular suite of probe packets and to inject those probe packets into the network. Alternatively, or in addition, at least one application component can directly implement the probe-generating component 106.

As noted above, the probe analysis system 102 can operate in at least two modes: a preliminary investigation mode and a directed probing mode. In the preliminary investigation mode, the switching fabric 104 processes preliminary-phase packets that correspond to "normal" application traffic, rather than specifically-formulated probe packets. In this mode, each switch that is configured to perform a mirroring function will mirror the received packet to produce a mirrored packet (providing that the received packet satisfies a specified matching condition). In the directed probing mode, the switching fabric 104 processes probe packets that are directed to a specific switch or a specific collection of switches in the switching fabric 104. Here, the switch that receives a probe packet will perform both a mirroring function and a decapsulation function. Again, the switch may be alerted to the fact that it has received a probe packet based on the fact that it receives the packet on its loopback IP address.

To clarify the above explanation, FIG. 4 depicts the operation of the probe analysis system 102 in the directed probing mode, with respect to the injection of a single probe packet $P_1$ into the network. Assume that this probe packet $P_1$ is configured in the same manner as the first probe packet 204 of FIG. 2. It includes an embedded innermost probe packet $P_{inner}$ that is embedded in the probe packet $P_1$ via a single level of encapsulation. Further assume that the first probe packet $P_1$ has a destination address that is associated with a first switch $S_1$ 410, and that the innermost probe packet $P_{inner}$ has a destination address that identifies a final destination entity 412, which may correspond to a computer server or some other component.

The routing functionality of the switching fabric 104 first routes the first probe packet $P_1$ to the first switch $S_1$ 410, based on the address specified by the first probe packet $P_{inner}$. The first switch $S_1$ 410 operates to: (1) mirror the first probe packet $P_1$ to produce a first mirrored packet $M_1$; (2) send the first mirrored packet $M_1$ to a selected multiplexer 414; (3) decapsulate the first probe packet $P_1$ to produce the innermost probe packet $P_{inner}$; and (4) send the innermost probe packet $P_{inner}$ through the switching fabric 104 to its next hop, along its way to the final destination entity 412.

In the case of FIG. 4, assume that the switching fabric 104 routes the innermost probe packet $P_{inner}$, that is produced by the first switch $S_1$ 410, to the final destination entity 412 via a second switch $S_2$ 416 and a third switch $S_3$ 418. But this is merely an illustrative path; generally, the path can encompass any number of additional switches (or no additional switches). When switch $S_2$ 416 processes the innermost probe packet $P_{inner}$, it generates a second mirrored packet $M_2$. Likewise, when switch $S_3$ 418 processes the innermost probe packet $P_{inner}$, it generates a third mirrored packet $M_3$.

In another scenario (not shown), assume that the first probe packet $P_1$ includes two or more layers of encapsulation, as in the example of FIG. 1. In that case, the switch $S_1$ 410 would perform an initial decapuslation to produce a second probe packet $P_2$, which is addressed to another switch (e.g., switch $S_2$ 416). Upon receiving the second probe packet $P_2$, the switch $S_2$ 416 would perform another decapsulation to produce a third probe packet $P_3$, and so on.

Each switch that produces a mirrored packet may apply at least one load-balancing consideration to select a multiplexer among the set of multiplexers 402. For example, as noted above, assume that the switch $S_1$ 410 selects the multiplexer 414 based on at least one load balancing consideration. In other implementations, the CA system 108 may provide a single multiplexer; in that case, each switch sends its mirrored packet to that multiplexer without choosing among plural available multiplexers.

Each multiplexer performs the function of further routing a received mirrored packet to one of the analysis components 404, based on at least one load-balancing consideration. The multiplexer will also choose a target analysis component such that mirrored packets that pertain to the same packet flow through the network are sent to the same analysis component. Each multiplexer itself can be implemented in any manner. In one case, at least one multiplexer may correspond to a hardware-implemented multiplexer, such as logic functionality provided by an ASIC device. In another case, at least one multiplexer corresponds to a software-implemented multiplexer, such as a multiplexing program running on a computer server. In other cases, the collection of multiplexers 402 may include a combination of hardware multiplexers and software multiplexers.

Assume that the multiplexer 414 routes the mirrored packet $M_1$ that it received from the switch $S_1$ 410 to a particular analysis component 420. In one implementation, the analysis component 420 may correspond to a computer server. Upon receipt, the analysis component 420 can perform various operations on the mirrored packet $M_1$, described above. As one such function, the analysis component 420 can associate the mirrored packet $M_1$ with other packets that pertain to the same packet flow. Initially, there are no other packets that belong to the flow, since the switch $S_1$ 410 is the first hop along the path. The analysis component 420 can also sort the mirrored packets in the order that they were created by the switches.

For example, at the completion of the innermost probe packet's path to its final destination entity 412, the analysis component 420 can generate the packet sequence 422, corresponding to the sequence of mirrored packets ($M_1$, $M_2$, $M_3$) created by the switches 410, 416, and 418. Finally, to repeat, the result aggregation component 406 aggregates information provided by the individual analysis components 404.

Figure 5:
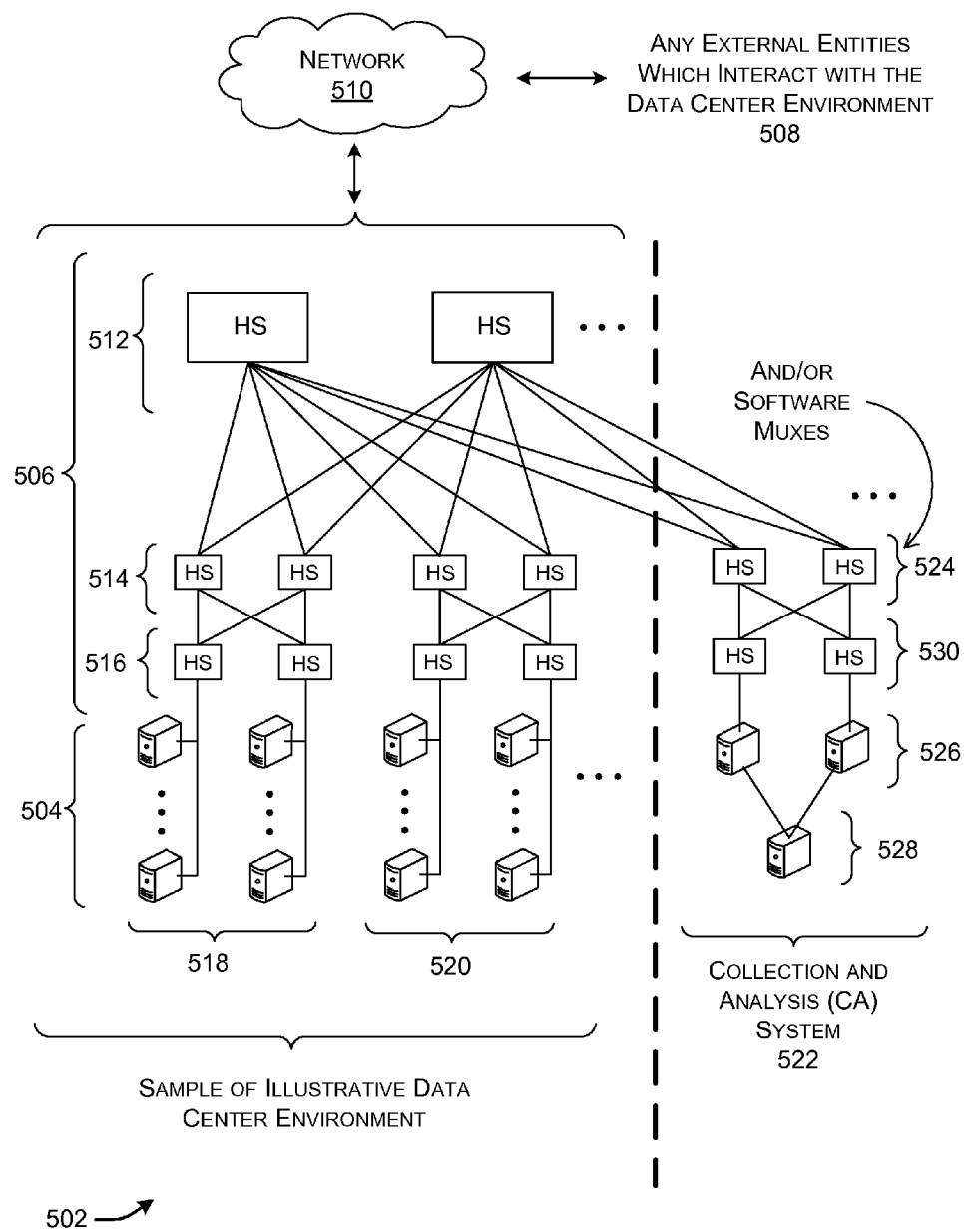
FIG. 5 shows additional details regarding the illustrative implementation of FIG. 4.

FIG. 5 shows an environment 502 which includes one non-limiting implementation of the probe analysis system 102 of FIGS. 1 and 4. The environment 502 corresponds to a data center that includes a plurality of computing devices 504, such as a plurality of computer servers. A network 506 allows computing devices 504 within the data center to communicate with other computing devices within the data center. The network 506 also allows external entities 508 to interact with the computing devices 504. A wide area network 510, such as the Internet, may couple the data center's network 506 with the entities 508.

The network 506 embodies a switching fabric that can have any topology. As shown in the particular and non-limiting example of FIG. 5, the network 506 includes a plurality of switches in a hierarchical topology. Without limitation, the switches can include core top-level switches 512, aggregation switches 514, top-of-rack (TOR) switches 516, and so on. Further, the network 506 may organize the computing devices 504 into containers, such as containers 518 and 520. An actual data center may include many more switches and computing units; FIG. 5 shows only a representative and simplified sample of the data center environment's functionality.

All of the switches in the network 506, or some subset thereof, include mirroring functionality and decapsulation functionality. Each instance of the mirroring functionality generates a mirrored packet when it processes a packet (assuming that that packet satisfies one or more packet-detection rules). Each instance of the mirroring functionality then forwards the mirrored packet to a collection and analysis (CA) system 522. Each instance of the decapsulation functionality removes the outer header of a received probe packet to produce a new probe packet.

In one implementation, the CA system 522 may provide dedicated equipment for only handling the collection and analysis of mirrored packets. In other implementations, the CA system 522 may perform a dual role of routing normal packet traffic within the network 506 and processing mirrored packets.

In one case, the CA system 522 includes one or more multiplexers 524. The multiplexers 524 may correspond to hardware multiplexers, and, more specifically, may correspond to hardware switches that have been reconfigured to perform a multiplexing role. Alternatively, or in addition, at least a subset of the multiplexers 524 may correspond to software-implemented multiplexers (e.g., corresponding to one or more computer servers).

The multiplexers 524 may be coupled to the top-level switches 512 of the network 506 and/or to other switches. Further, the multiplexers 524 may be directly coupled to one or more analysis components 526. Alternatively, as shown in FIG. 5, the multiplexers 524 may be connected to the analysis components 526 via switches 526, using any connection topology. The analysis components 526 may provide their results to a result aggregation component 528.

In conclusion to Subsection A.1, the probe analysis system 102 may exhibit several useful technical effects. According to one effect, the probe analysis system 102 provides a mechanism for diagnosing problems in a network without requiring expensive reconfiguration of an existing network. The probe analysis system 102 accomplishes this goal, in part, by reprogramming and repurposing mirroring and decapsulation capabilities that are already present on the switches in the network, and without necessarily adding special testing mechanisms to individual switches. (For example, each switch may already provide decapsulation capability for performing a conventional packet-tunneling operation.)

Second, the probe analysis system 102 provides a technique for investigating the network on a fine-grained level. The probe analysis system 102 accomplishes this goal by constructing probe packets that target the performance of individual switches and links. Further, the probe analysis system 102 can investigate the performance of these individual components without introducing the biasing effects of other components that are not the focus of the investigation, or by minimizing the influence of the other components.

Third, the probe analysis system 102 provides a technique for collecting a relatively large volume of results without burdening normal traffic flow through the network. The probe analysis system 102 achieves this result by leveraging the network's data plane to collect mirrored packets, in conjunction with the use of high-speed multiplexers to sort mirrored packets. Moreover, the probe analysis system 102 provides a solution that is scalable with respect to increases in network size.

Fourth, the probe analysis system 102 can investigate the network's behavior in its normal production environment. For example, the probe analysis system 102 does not rely on out-of-band probing paths that differ from the paths taken by normal application traffic. Further, the probe analysis system 102 can repurpose existing capabilities of the switches, without introducing special testing mechanisms that have no role in the normal production environment. All of these characteristics reduce biasing effects that might otherwise be caused by the testing functionality.

Fifth, the probe analysis system 102 provides an accurate mechanism for measuring latencies on individual links. For example, as described with reference to FIG. 3, the CA system 108 can compute the latency of the link 312 by using a single internal reference clock (maintained by the CA system 108), rather than relying on two timestamps associated with two reference clocks. It would be difficult to synchronize two separate reference clocks with the requisite degree of accuracy.

The above technical effects are cited by way of example, not limitation; the probe analysis system 102 may exhibit yet additional useful effects.

A.2. Illustrative Switch Having Mirroring and Decapsulation Capability

Figure 6:
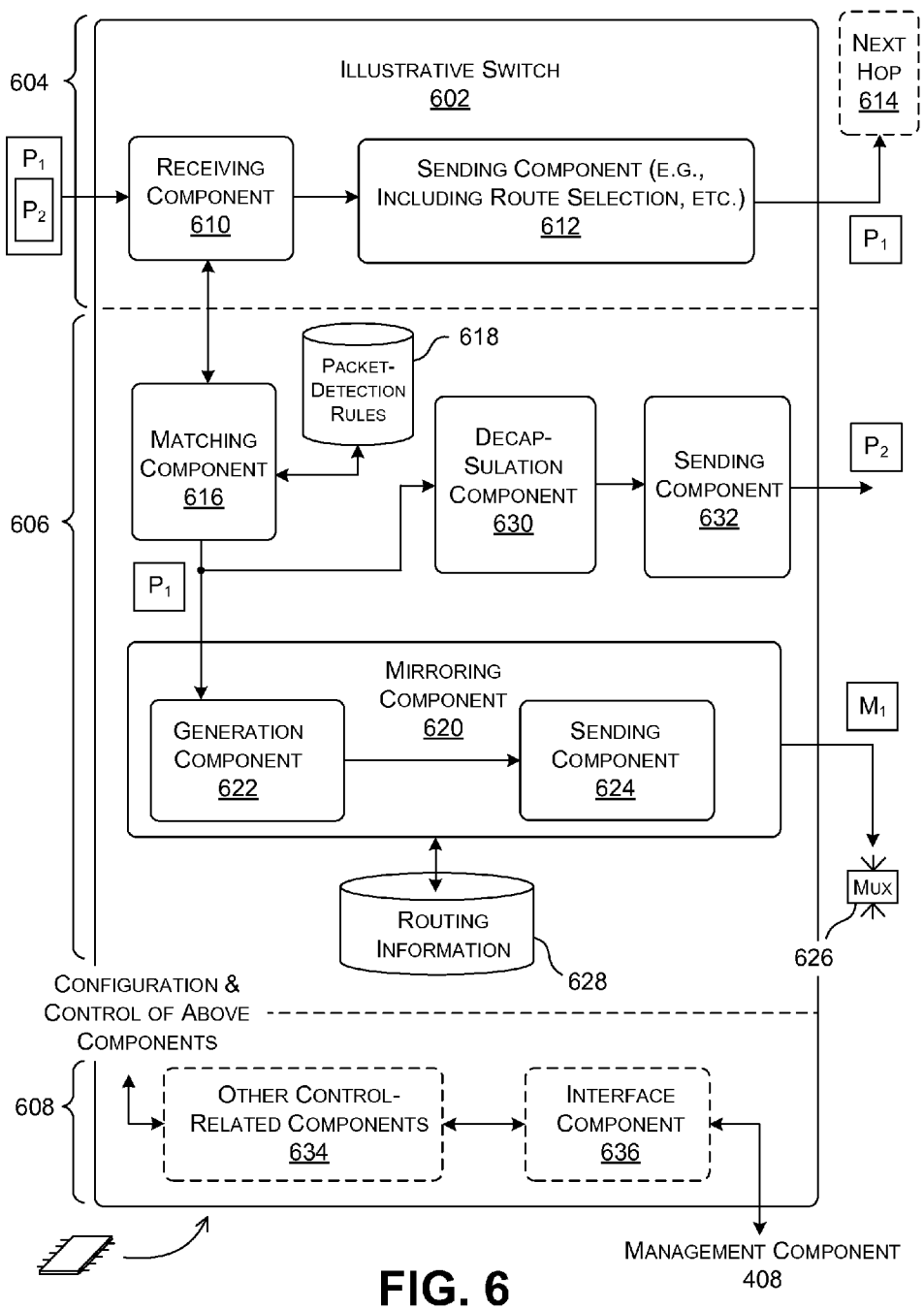
FIG. 6 shows one implementation of an illustrative switch, for use in the probe analysis system of FIGS. 4 and 5.

FIG. 6 shows an illustrative switch 602 that has mirroring capability and decapsulation capability. From a high-level perspective, the switch 602 may include functionality for performing three main functions. Functionality 604 allows the switch 602 to perform its traditional role of forwarding a received packet $P_1$ to a target destination. Functionality 606 performs the mirroring and decapsulation aspects of the switch's operation. And functionality 608 performs various management functions. More specifically, for ease of explanation, FIG. 6 illustrates these three functionalities (604, 606, 608) as three separate domains. However, in some implementations, a single physical module may perform two or more functions attributed to the distinct domains shown in FIG. 6.

The functionality 604 and the functionality 606 represent data plane functionality, while the functionality 608 represents part of the switch's control plane functionality. The data plane functionality can be implemented, at least in part, using hardware logic (e.g., as an ASIC device). The control plane functionality can be implemented, at least in part, using one or more central processing units (CPUs).

Beginning with the functionality 604, a receiving component 610 receives a packet $P_1$ from any source, such as an "upstream" switch. The received packet $P_1$ may correspond to a preliminary-phase packet or a probe packet. A sending component 612 chooses the next destination of the received packet $P_1$, corresponding to a next hop 614. The next hop 614, in turn, may correspond to the ultimate target destination of the received packet $P_1$, or another "downstream" switch along a multi-hop path. The sending component 612 may consult routing information provided in a data store (not shown) in choosing the next hop 614. The sending component 612 may also use any protocol in choosing the next hop 614, such as BGP.

With respect to the mirroring and decapsulation functionality 606, a matching component 616 determines whether the received packet $P_1$ matches any of the packet-detection rules which are stored in a data store 618. If so, a mirroring component 620 includes a generation component 622 that generates a mirrored packet $M_1$ associated with the received packet $P_1$.

More specifically, the generation component 622 can produce the mirrored packet $M_1$ by extracting a subset of information from the received packet $P_1$, such as information extracted from the received packet's outer header and/or inner headers, and/or the received packet's body(ies). The generation component 622 can use available packet-copying technology to create the mirrored packet $M_1$, such as Encapsulated Remote Switched Port Analyzer (ERSPAN) technology provided by Cisco Systems, Inc., of San Jose, Calif.

The generation component 622 can also add information that is not present in the received packet $P_1$, such as metadata produced by the switch 602 itself in the course of processing the received packet. For example, the switch 602 can add information regarding an error condition that has been encountered by the switch 602 in processing the received packet $P_1$. In another example, the switch 602 may set a flag value in the mirrored packet $M_1$ that marks it as a mirrored packet, and not an original (non-mirrored) packet. Each downstream switch may read this flag value to determine if the packet that is received is a mirrored packet. If the received packet is a mirrored packet, the switch will decline to create a mirrored copy of it, to thereby prevent the switch from mirroring a mirrored packet.

A sending component 624 chooses a multiplexer, among a set of multiplexers 402 (of FIG. 4), to which to send the mirrored packet $M_1$. In the context of FIG. 6, assume that the sending component 624 selects a multiplexer 626. In one implementation, the sending component 624 can use a hashing algorithm to hash any tuple of information items included in the received packet $P_1$, such as different information items provided in the header of the received packet's innermost IP header. The hashing operation produces a hash result, which, in turn, may be mapped to a particular multiplexer. All switches that have mirroring mechanisms employ the same hash function. Overall, the hashing operation has the effect of spreading mirrored packets over the available set of multiplexers 402. A data store 628 provides information to which the sending component 624 may refer in performing its operation; for example, the data store 628 may identify the available multiplexers 402, e.g., by providing their respective addresses.

In one implementation, after choosing a multiplexer, the sending component 624 generates an encapsulated mirrored packet to send to the multiplexer. For example, the sending component 624 can use any tunneling protocol (such as Generic Routing Encapsulation (GRE)) to encapsulate the mirrored packet $M_1$ in a tunneling packet, and then append a multiplexing IP header "on top" of the tunneling protocol header.

A decapsulation component 630 decapsulates the received packet $P_1$ when it is determined that the received packet $P_1$ is a probe packet having at least one embedded probe packet. The matching component 616 can determine whether the received packet $P_1$ is a probe packet based on whether that packet was received via the loopback IP address of the switch 602 and/or based the presence or absence of telltale status information in the received packet $P_1$. The decapsulation component 630 can perform decapsulation by removing an outmost header (associated with packet $P_1$) to produce a second probe packet $P_2$. A sending component 632 then routes the second probe packet $P_2$ to whatever address is specified in the probe packet $P_2$. The second probe packet $P_2$ may or may not include a further encapsulated probe packet.

The management functionality 608 may include other control components 634 for handling other respective tasks. For example, a routing management component may perform tasks such as broadcasting the existence of the switch 602 to other switches in the network, determining the existence of other switches, updating the routing information in the switch 602 and so on. An interface component 636 receives management information and other instructions from the management component 408.

Now referring to the matching component 616 in greater detail, that component can apply one or more packet-detection rules to determine whether the received packet $P_1$ should be mirrored. For instance, some packets may include a packet-type value that indicates that they should, by default, be mirrored without further consideration. In practice, an application that is running on a computing device can set this packet-type value for application packets which it generates and sends out over the network. The application can perform this task for any reason; for example, the application can set the packet-type value in response to a request from the management component 408. The matching component 616 can determine whether the packet-type value is set in each packet that it receives, and, if so, create a mirrored counterpart of that received packet.

Assuming that the packet-type value is not set in the received packet, the matching component 616 can use one or more other rules to nevertheless determine whether the packet should be mirrored. For example, as one type of rule, the matching component 616 can determine that the received packet $P_1$ should be mirrored when it specifies one or more particular protocol-related values. Illustrative protocol-related values may correspond, for instance, to one or more Transmission Control Protocol (TCP) flag values, such as TCP SYN, FIN, or RST values, etc.

As a second type of rule, the matching component 616 can determine that the received packet $P_1$ should be mirrored when it specifies certain IP source and/or destination addresses, and/or certain source and/or destination ports, and so on.

As a third type of rule, the matching component 616 can determine that the received packet $P_1$ should be mirrored when it originates from a particular application (which, in turn, can be determined on the basis of an information item added to the packet $P_1$ by that particular application).

As a fourth type of rule, the matching component 616 can determine that the received packet $P_1$ should be mirrored when a particular condition or circumstance is encountered in the course of the switch 602 processing the received packet $P_1$.

In addition, any packet rule can specify the frequency at which packets of different types are to be mirrored. Generally stated, one such rule may specify that every encountered packet of type abc is to be mirrored, but every one out of every n packet of type efg is to be mirrored.

The above rules are cited by way of illustration, not limitation; other environments can apply additional types of packet-detection rules. Further, note that, in some cases, a packet-detection rule may be triggered upon detecting a single information item in the received packet $P_1$, such a single flag value in the received packet $P_1$. But in other cases, a packet-detection rule may be triggered upon detecting a combination of two or more information items in the received packet $P_1$, such as a combination of two flag values in the received packet $P_1$.

In any of the above cases, the information item(s) which trigger a rule may appear in the header(s) and/or body(ies) of the received packet $P_1$. Alternatively, or in addition, a packet-detection rule may be triggered by other characteristic(s) of the received packet $P_1$. For example, a packet-detection rule may be triggered upon detecting that the received packet $P_1$ is corrupted, or manifests some other error or matching condition.

A.3. Illustrative Multiplexer

Figure 7:
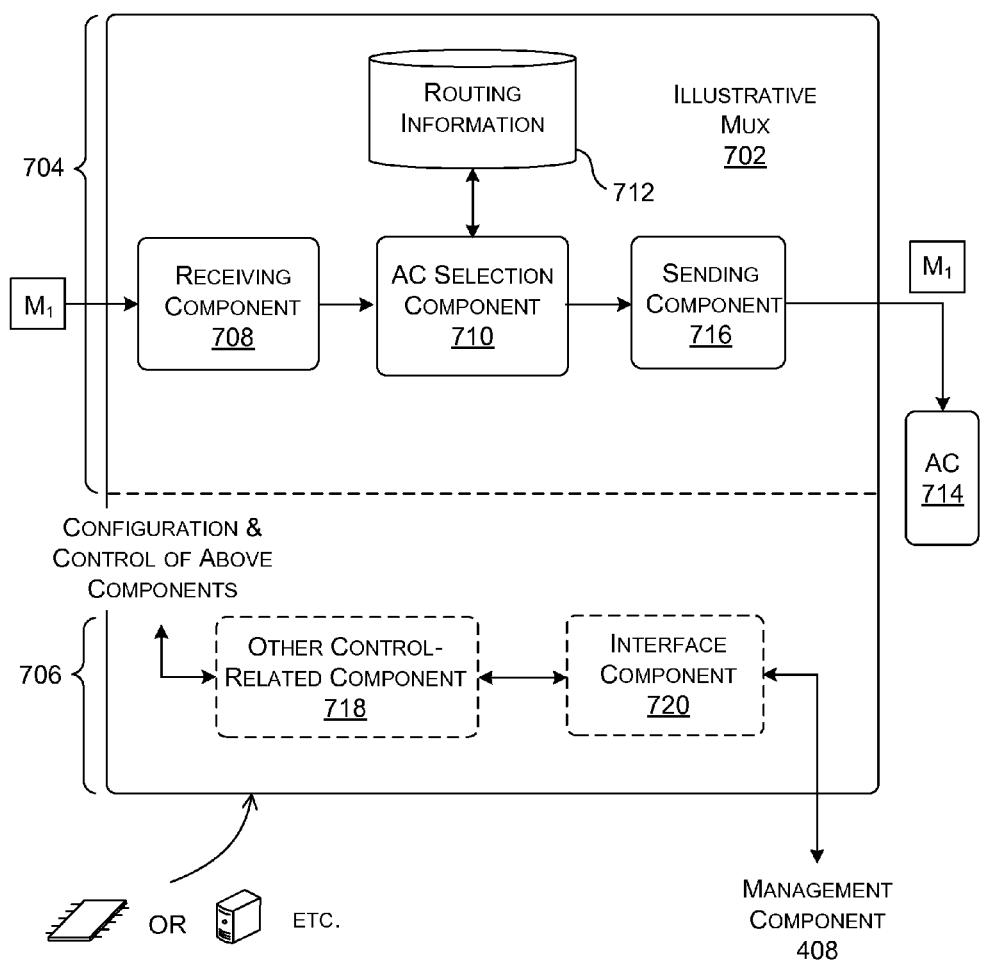
FIG. 7 shows one implementation of an illustrative multiplexer, for use in the probe analysis system of FIGS. 4 and 5.

FIG. 7 shows one implementation of an illustrative multiplexer 702 for use in the CA system 108 of FIG. 4. More specifically, the multiplexer 702 may correspond to one of the set of multiplexers 402 shown in FIG. 4. Or the multiplexer 702 may correspond to a sole multiplexer provided by the CA system 108.

The multiplexer 702 may correspond to a hardware-implemented device or a software-implemented device, or some combination thereof. In the former case, the hardware multiplexer may correspond to a commodity switch which has been reprogrammed and repurposed to perform a multiplexing function. Or the hardware multiplexer may correspond to a custom-designed hardware component that is constructed to perform the functions described below.

The multiplexer 702 includes functionality 704 for performing the actual multiplexing function, together with functionality 706 for managing the multiplexing function. The functionality 704 may include a receiving component 708 for receiving a mirrored packet $M_1$. The functionality 704 may also include an AC selection component 710 for selecting an analysis component among the set of candidate analysis components 404. The AC selection component 710 consults routing information in a data store 712 in performing its operation. In the case of FIG. 7, assume that the AC selection component 710 chooses to send the mirrored packet $M_1$ to the AC 714. A sending component 716 then sends the mirrored packet $M_1$ to an AC 714.

As to the management-related functionality 706, one or more control-related components 718 may manage any aspect of the operation of the multiplexer 702. For example, the control related components 718 may provide address information for storage in the data store 712, which identifies the addresses of the ACs 404. An interface component 720 interacts with the management component 408 (of FIG. 4), e.g., by receiving control instructions from the management component 408 that are used to configure the operation of the multiplexer 702.

The AC selection component 710 may select an AC from the set of ACs 404 based on any load-balancing consideration. In one approach, the AC selection component 710 uses a hashing algorithm to hash information items contained with the innermost header of the original packet, which is information that is also captured in the mirrored packet. The resultant hash maps to one of the analysis components 404. The hashing algorithm also ensures that packets that pertain to the same packet flow are mapped to the same analysis component. The probe analysis system 102 can achieve this result by selecting input information items from the innermost header of the original packet (which serve as an input key to the hashing algorithm) that will remain the same as the original packet traverses the path through the network, or which will otherwise produce the same output hash value when acted on by the hashing algorithm. Further, the probe analysis system 102 deploys the same hashing algorithm on all of the multiplexers 402.

As a final comment, the multiplexers 402 have a high throughput, particularly in the case in which the multiplexers 402 correspond to repurposed hardware switches or other hardware devices. This characteristic is one feature that allows the probe analysis system 102 to handle high traffic volumes; this characteristic also promotes the scalability of the probe analysis system 102.

A.4. Illustrative Analysis Component

Figure 8:
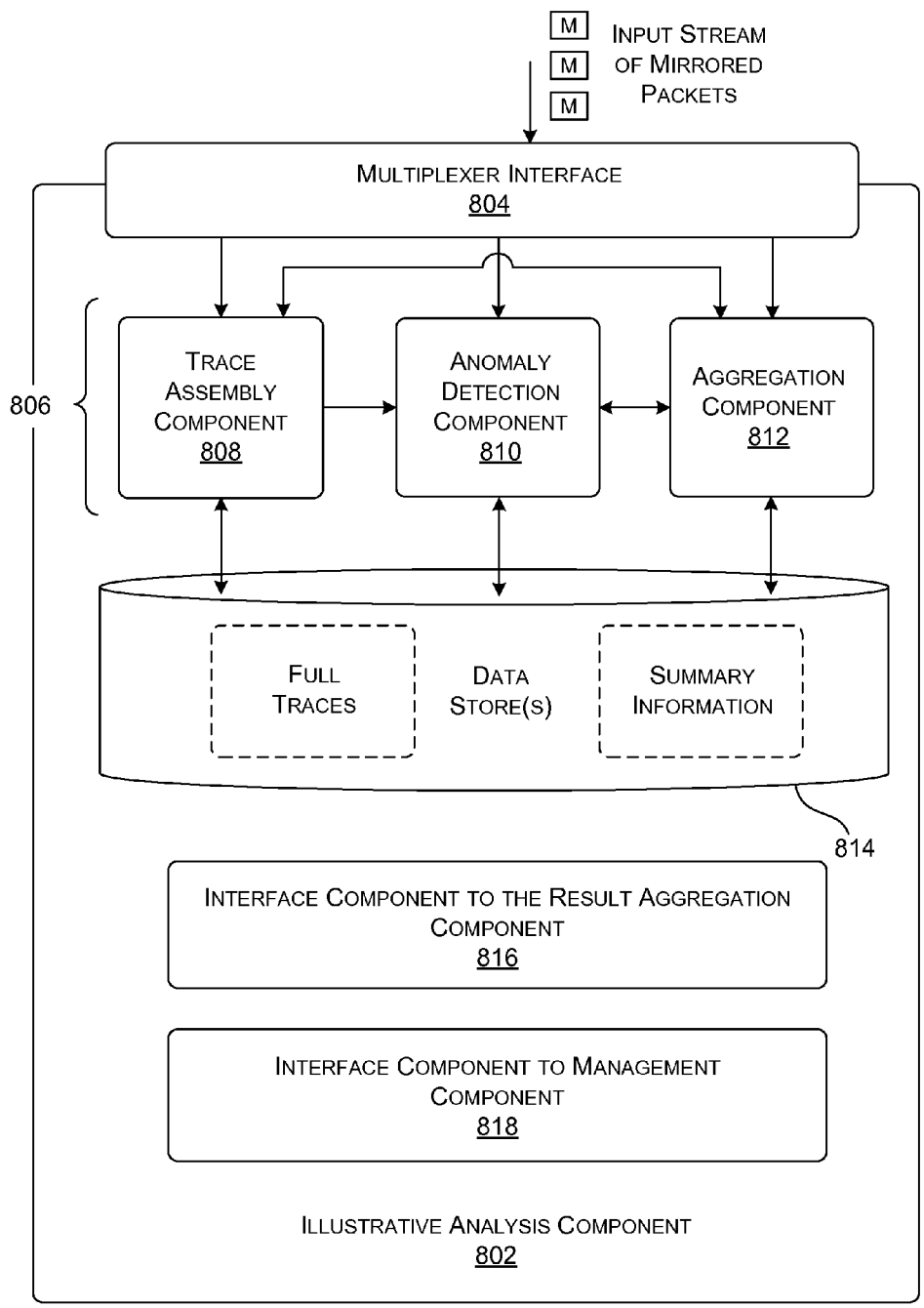
FIG. 8 shows one implementation of an illustrative analysis component, for use in the probe analysis system of FIGS. 4 and 5.

FIG. 8 shows one implementation of an analysis component 802, corresponding to one of the analysis components 404 of FIG. 4. Other analysis components may have a similar construction to that shown in FIG. 8 and operate in parallel to the analysis component 802 shown in FIG. 8.

The analysis component 802 receives streams of mirrored packets from the multiplexers 402 via a multiplexer interface 804. As described above, the multiplexers 402 forward mirrored packets that pertain to the same path through the network to the same analysis component. Hence, in one implementation, the stream of mirrored packet that is received by the analysis component 802 will not contain mirrored packets that pertain to the flows handled by other analysis components. The multiplexer interface 804 can also perform preliminary processing on the received packets, such as by removing outer headers of the received packets.

The analysis component 802 may include a collection of one or more processing engines 806 that operate on the stream of mirrored packets. For example, at least one trace assembly component 808 may group the set of mirrored packets together that pertain to the same flow or path through the network into a single trace. In the example of FIG. 4, for instance, the trace assembly component 808 can assemble the mirrored packets produced by switches 410, 416, and 418 into a single trace, to yield the mirrored packet sequence 422 that includes at least mirrored packets $M_1$, $M_2$, and $M_3$. The trace assembly component 808 can also order the mirrored packets in a trace according to the order in which they were created by their respective switches and/or received by the analysis component 802.

The trace assembly component 808 can determine that a group of mirrored packets belongs to the same flow based on header information associated with an innermost packet (in case that the received packets employ one or more layers of encapsulation). The trace assembly component 808 can conclude that it has received a full trace when it receives no further mirrored packets corresponding to a particular flow after waiting for more than a prescribed time period $t_{wait}$ (e.g., one second).

An anomaly detection component 810 performs preliminary processing on the received packets to determine whether they contain anomalies. For example, the anomaly detection component 810 can examine each trace that is assembled to determine if it contains a dropped packet. The anomaly detection component 810 can make this decision, in turn, by determining whether the trace is prematurely truncated, indicating that the packet did not reach its intended final destination, or that packet otherwise did not encounter an expected switch or switches along it path. The anomaly detection component 810 can consult network topology information and routing protocol information in making a packet loss diagnosis. The anomaly detection component 810 can also provide preliminary diagnoses of other potential failures, such as latency-related problems, loop-related problems, load-balancing problems, and so on.

An aggregation component 812 may produce summary information that reflects the performance of the network. For example, the aggregation component 812 can compute the load on each link by counting the number of mirrored packets which have traversed that link. The aggregation component 812 can also compute summary information regarding latencies on the network's links. The latency-related summary information can be formulated as a histogram having a number of bins, where each bin reflects a number of occurrences of latency measurements that fall within a prescribed time range associated with the bin. The aggregation component 812 can report its results on a periodic basis and/or an event-driven basis.

A data store 814 stores the information produced by the processing engines 806. The analysis component 802 can apply different environment-specific rules to determine what information is retained, and the format in which the information is retained. In one case, for instance, the trace assembly component 808 can store all traces that it produces or some sample thereof (e.g., by storing one out of every n traces that it produces). In another case, the trace assembly component 808 can archive only traces that the anomaly detection component 810 has diagnosed as anomalous. Likewise, the aggregation component 812 can store all summary information that it produces or some sample thereof (e.g., by storing one out of every m instances of summary information). In another case, the aggregation component 812 can archive only instances of summary information that the anomaly detection component 810 has diagnosed as anomalous.

An interface component 816 allows the result aggregation component 406 to retrieve the information archived by the analysis component 802. The result aggregation component 406 combines the retrieved information with other information collected by other analysis components into a single searchable database. Applicant components can interact with the result aggregation component 406 via application programming interfaces (APIs).

Another interface component 818 allows the management component 408 to communicate with the analysis component 802, and vice versa. For example, the management component 408 can use the interface component 818 to send instructions to the analysis component 802 for any application-specific reason. For instance, the management component 408 can instruct the analysis component 802 to vary its anomaly-detection process, and/or to vary the manner in which it archives its results, etc.

A.5. Illustrative Application Components

In one implementation, the application components interact with a separate device which implements the probe-generating component 106. In another implementation, at least one application component can incorporate its own instantiation of the probe-generating component 106 as part thereof. In either case, each application component can interact with the probe-generating component 106 to control the manner in which the probe-generating component 106 generates probe packets.

In one model of interaction, for instance, an application component can specify the switch or switches that are to be targeted by probe packets, e.g., by specifying the address(es) of those switch(es). The probe-generating component 106 will then produce one or more probe packets which target those switch(es), and then inject those probe packets into the network. The network, in turn, will produce mirrored packets when its switches process the probe packets. The application component can then retrieve and analyze those mirrored packets from the result aggregation component 406.

More specifically, an application component can define a testing regimen by specifying plural main characteristics of that regimen. As a first main characteristic, the application component can define the focus of investigation of the testing regimen. For instance, in some cases, the application component can instruct the probe-generating component 106 to target one specific switch in the switching fabric 104. In other cases, the application component can instruct the probe-generating component 106 to target one specific path in the switch fabric, made up of two or more switches. In yet other cases, the application component can instruct the probe-generating component to investigate plural individual switches and/or plural individual paths in the switching fabric 104. The application component 110 can adopt this approach when there is some uncertainty as to the possible source of an anomaly, and hence, the application component 110 defines a scope of analysis that encompasses plural potential sources.

As another main characteristic, an application component can send a single probe packet to the target switch(es) or can send plural redundant packets to the target switch(es). An application component may choose to send redundant packet to the target switch(es) to determine whether a fault is consistently or intermittently present in the network.

As another main characteristic, an application component can instruct the probe-generating component 106 to generate probe packets that target the same switch(es), but which otherwise differ from each other in one or more respects. For example, the probe-generating component 106 can generate a suite of probe packets which differ from each other by including different parameter values in one or more of the header fields of the probe packets. An application component can use this type of testing strategy to determine whether any of the variations in the packets has an effect on the performance of the affected switch(es), and to thereby gain a more complete understanding of the cause of a failure in the network.

Packet Loss Analysis

In addition to the above general features, different application components may perform different analyses to detect different types of failures. For instance, an application component can detect packet drops by first preliminarily identifying traces which appear to exhibit packet drops, e.g., as a result of analysis performed in the preliminary investigation phase. In one case, a trace exhibits a packet drop when it prematurely truncates, indicating that the packet that did not arrive at least one expected switch along its path.

Next, the application component can identify the general location of each hypothesized packet drop. For example, assume that a trace indicates that a packet was last "seen" at switch $S_{last}$. Further assume that the network topology information and routing protocol information indicate the packet should have been thereafter sent to $S_{next}$, but that there is no evidence that $S_{next}$ received packet. In other cases, the network topology information and routing protocol information may indicate that there are plural candidate switches ($S_{next1}$, $S_{next2}$, ...) that might have received the packet after switch $S_{last}$, but that none of them appears to have received the packet. These switches are referred to here as target switches to indicate that they will henceforth serve as a focus of analysis in the direct probing phase.

Next, the application component can instruct the probe-generating component 106 to generate a set of probe packets that focus on the target switch(es), and inject those probe packets into the network. For example, the application component can instruct the probe-generating component 106 to create at least one probe packet ($P_1$) that includes an outer-packet destination address that causes it to be directed to the switch $S_{last}$. The probe packet $P_1$ may include an encapsulated inner packet ($P_{inner}$) which is directed to the switch $S_{next}$, or one of the possible next switches ($S_{next1}$, $S_{next2}$, ...). In addition, or alternatively, the application component can instruct the probe-generating component 106 to vary parameter value(s) in the header(s) of the probe packets, to explore the possibility that these values have a role in the packet loss that is being encountered. In yet another approach, the application component can instruct the probe-generating component 106 to send one or more probe packets $P_1$ directly to the $S_{next}$ switch, or to the set of next switches ($S_{next1}$, $S_{next2}$, ...).

Next, the application component can analyze the mirrored packets that are produced as a result the injection of the probe packets in the network. For example, the application component can examine the mirrored packets to determine whether these packets consistently lack mirrored packets from switch $S_{next}$. If so, the switch $S_{next}$ is thereby confirmed to be dropping packets.

Latency Analysis

An application component can investigate the latency between two network components (e.g., two host components) by first determining the links that may be traversed between these two network components. To find this out, in the preliminary investigation phase, the probe analysis system 102 can mirror TCP SYN packets between the two network components. Each link that is revealed in the mirrored packets is associated with two switches which define its endpoints.

The application component can then instruct the probe-generating component 106 to measure the latency on each link by creating the same type of probe packet $P_1$ 310 described above with reference to FIG. 3. To repeat, that probe packet (or some variant thereof) passes from switch $S_1$ 304 to switch $S_2$ 308, and then back to switch $S_1$ 304. The switch $S_1$ 304 generates a mirrored packet each time it encounters some variant of original probe packet $P_1$ 310. The CA system 108 receives these mirrored packets at time $t_1$ and time $t_2$, as measured by a single reference clock maintained by the CA system 108. The application component can then compute the latency on the link 312 based the difference between these two times ($t_1$, $t_2$).

Load-Balancing Analysis

An application component can investigate the performance of a load-balancing mechanism by instructing the probe-generating component 106 to send probe packets to a network component that performs a multiplexing function. More specifically, assume that the network component may route an incoming packet over any one of a set of possible paths. The probe-generating component 106 can generate a subset of probe packets that targets each possible path. For example, the probe-generating component 106 can configure the header information in each subset of packets such that it will be resolved by the network component's hashing algorithm into a particular path. After injecting these probe packets into the network, the application component can then examine the resultant mirrored packets to determine whether the network component indeed appears to be distributing load in an unbalanced manner.

The above three examples of analyses are cited by way of example, not limitation. In another case, an application component can instruct the probe-generating component 106 to perform analysis to detect the presence of loop-related behavior in the network. In another case, an application component can instruct the probe-generating component 106 to perform analysis to detect the presence of protocol-specific anomalies, and so on.

A.6. Illustrative Variations

The packet analysis system 102 can be varied in any number of ways, compared to the implementation set forth above. In one variation, a switch can produce a mirrored packet using its control plane functionality, rather than, or in addition to, its data plane functionality. The control plane functionality can then forward the mirrored packet to the CA system 108 using any data path.

In another variation, a switch can use different strategies to capture mirrored information, compared to the approaches described above. For example, a switch can produce metadata and add that metadata to the probe packet itself. That metadata constitutes the mirrored information, and may include, for example, a timestamp produced by the switch itself, etc. The CA system 108 may then extract the mirrored information from the probe packets at any juncture, such as their arrival at an intended destination.

Still other variations are possible.

B. Illustrative Processes

Figure 9:
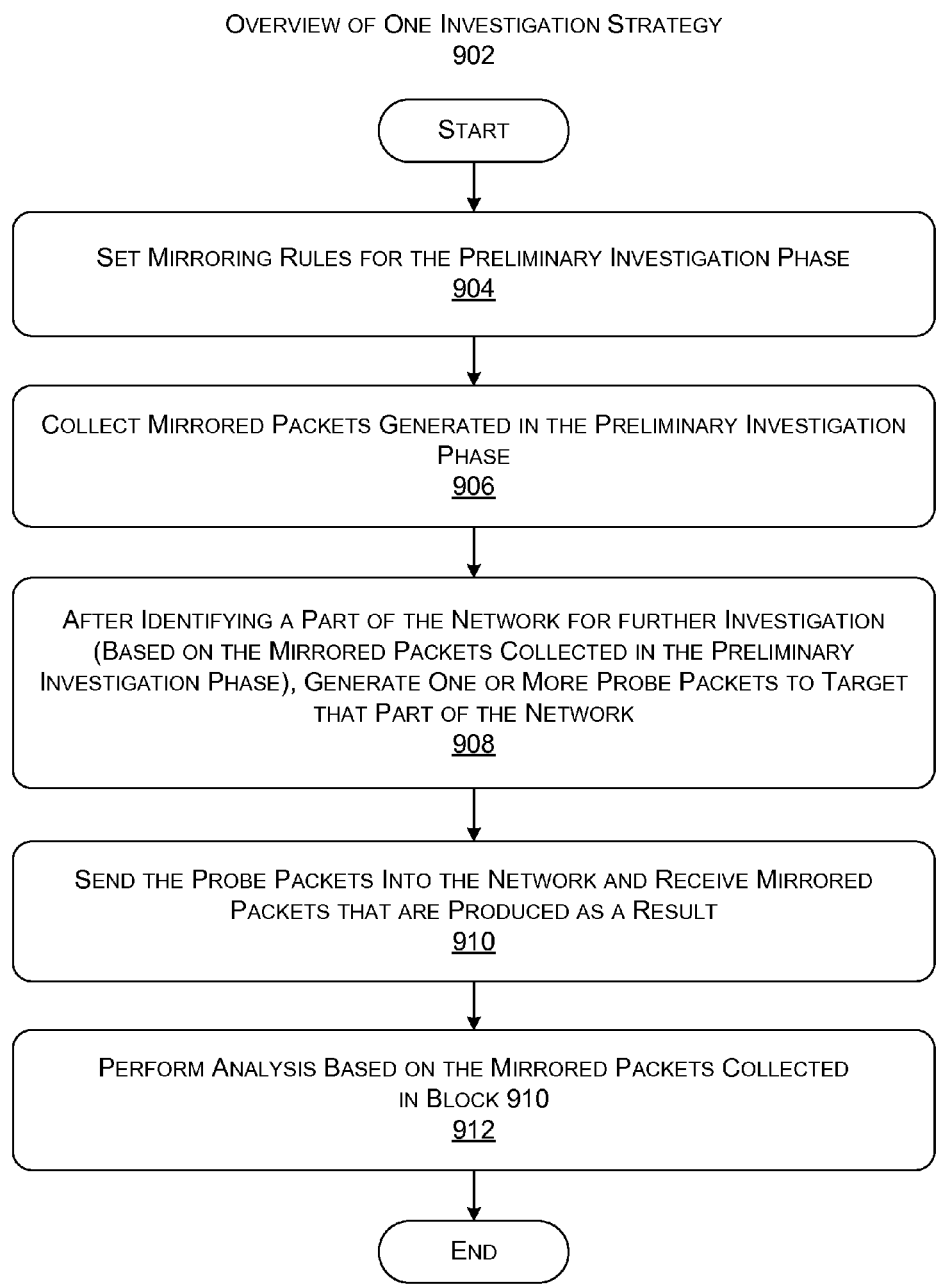
FIG. 9 shows a process that provides an overview of one manner of using the probe analysis system of FIG. 1.
Figure 10:
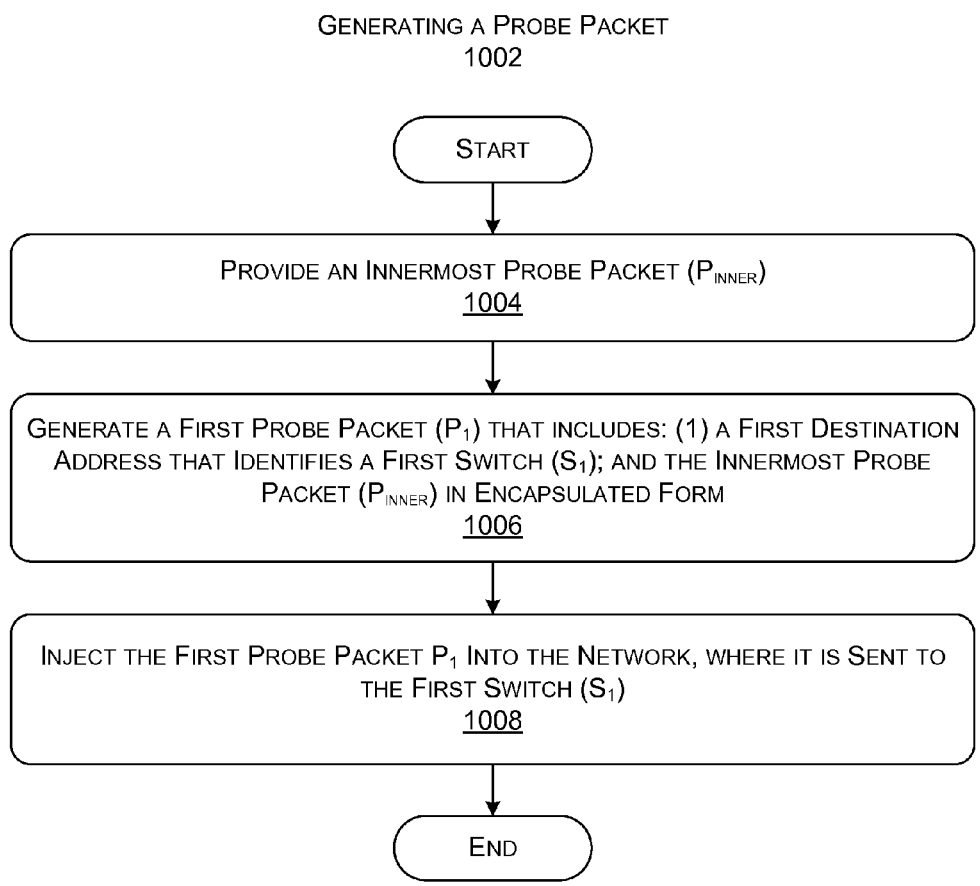
FIG. 10 shows a process that explains one manner of operation a probe-generating component, which is one component of the probe analysis system of FIG. 1.
Figure 11:
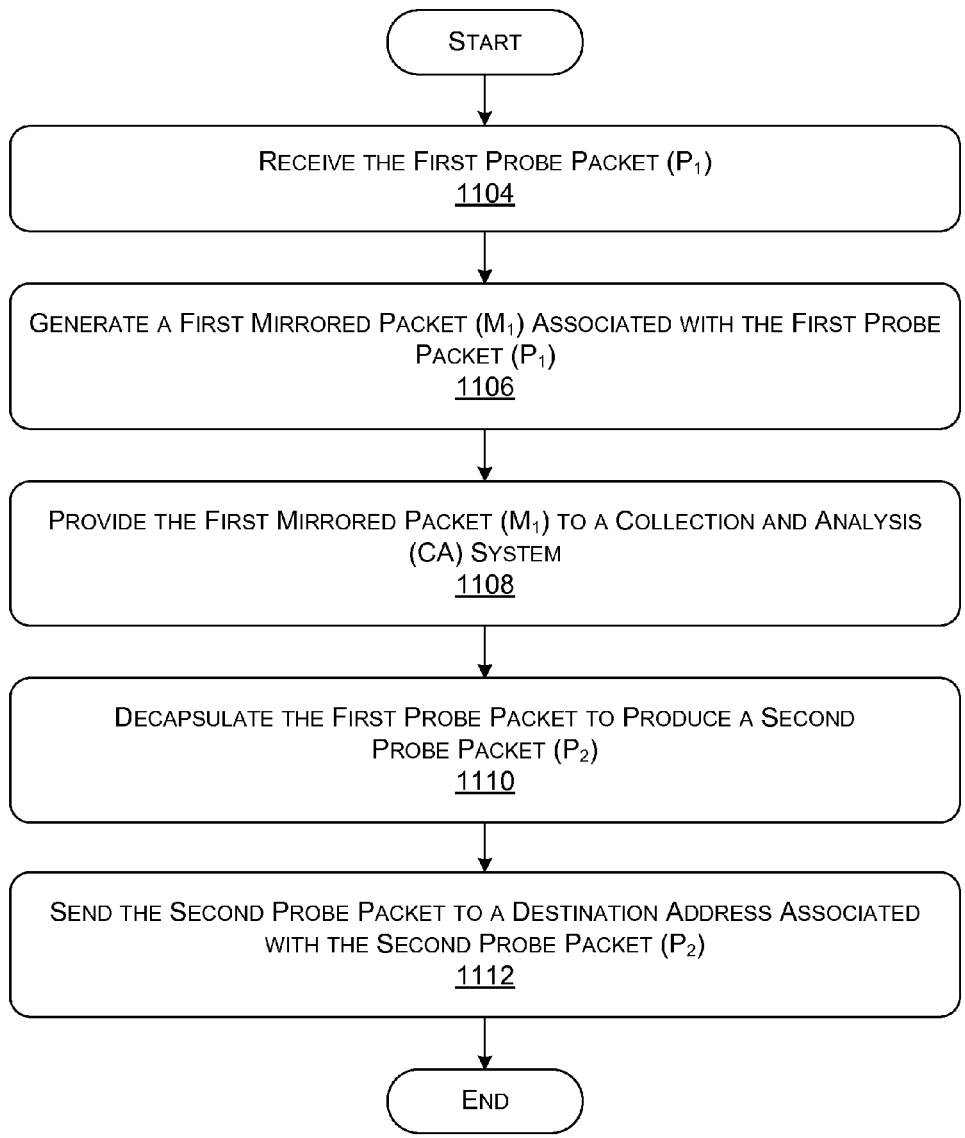
FIG. 11 shows a process that explains one manner of operation of a switch within the probe analysis system of FIG. 1.

FIGS. 9-11 show processes that explain the operation of the probe analysis system 102 of Section A in flowchart form. Since the principles underlying the operation of the probe analysis system 102 have already been described in Section A, certain operations will be addressed in summary fashion in this section.

Starting with FIG. 9, this figure shows a process 902 that provides an overview of one manner of using the probe analysis system 102 of FIG. 1. Blocks 904 and 906 describe an optional preliminary investigation phase (which may also be referred to as a preliminary measurement phase). In this phase, the probe analysis system 102 passively monitors the performance of the entire network, or a comprehensive portion thereof, rather than narrowly probing particular network switches within the network. More specifically, in block 904, the management component 408 (of FIG. 4) sets packet-detection rules for use in the preliminary investigation phase. The packet-detection rules define the circumstances in which preliminary-phase packets will be mirrored by the network's switches. In block 906, the probe analysis system 102 collects preliminary-phase mirrored packets generated in the preliminary investigation phase.

A human analyst and/or an automated analysis component can then examine the preliminary-phase mirrored packets to determine whether any particular part of the network is misbehaving. For example, a human analyst and/or automated analysis component can examine the preliminary-phase mirrored packets to determine the presence of any of: packet loss problems, latency-related anomalies, looping-related problems, load-balancing-related problems, protocol-specific problems, etc.

Blocks 908-912 correspond to a directed probing phase. In block 908, the probe-generating component 106 constructs one or more probe packets that target the particular part of the network that has been identified as a result of the preliminary investigation phase. For example, the probe-generating component 106 may generate one or more probe packets which investigate one or more switches in the general domain in which a packet loss appears to have occurred.

In block 910, the probe-generating component 106 sends the probe packets which it has generated into the network. This prompts the targeted switches to produce mirrored packets. The CA system 108 then receives and processes the mirrored packets. In block 912, an application component can perform any analysis on the mirrored packets that have been generated in the direct probing phase. For example, an application component can perform analysis to detect the cause of packet loss, the cause of latency-related problems, the cause of loop-related problems, and so on.

In another manner of use, the probe-generating component 106 can perform blocks 908-912 without the benefit of the preliminary investigation phase (in blocks 904 and 906). The probe-generating component 106 can perform this analysis in response to an event (such as a failure in the network), a periodic trigger which invokes its operation, an instruction from a human analyst, and so on.

FIG. 10 shows a process 1002 that explains one manner of operation the probe-generating component 106 in the direct probing phase. As just explained above with reference to FIG. 9, the probe-generating component 106 can perform its direct probing operation in response to a preliminary investigation stage, or in a manner that is independent of a preliminary investigation phase.

In block 1004, the probe-generating component 106 constructs (or otherwise provides) an innermost probe packet $P_{inner}$. In one case the innermost probe packet $P_{inner}$ may identify the innermost encapsulated probe packet that is to be sent to a final destination entity. In block 1006, the probe-generating component 1006 constructs a first probe packet $P_1$. The first probe packet $P_1$ specifies an address (i.e., a first destination address) to which the first probe packet is to be directed. The first probe packet $P_1$ also embeds the innermost probe packet $P_{inner}$ in one or more layers of encapsulation (as illustrated in FIG. 1). In block 1008, the probe-generating component injects the first probe packet $P_1$ into the network. The routing functionality of the network will then route the first probe packet $P_1$ to the switch associated with the first probe packet $P_1$.

FIG. 11 shows a process 1102 that explains one manner of operation of a switch within the probe analysis system of FIG. 1, such as the switch 602 of FIG. 6. In block 1104, the switch 602 receives the probe packet ($P_1$) to which it is addressed, e.g., via its loopback IP address. In block 1106, the switch 602 generates a mirrored packet ($M_1$) that is associated with the probe packet $P_1$ (providing that a mirroring condition is met). In block 1108, the switch 602 provides the mirrored packet ($M_1$) to the CA system 108. In block 1110, the switch 602 decapsulates the received probe packet $P_1$ to produce a second probe packet ($P_2$). In block 1112, the switch 602 sends the second probe packet ($P_2$) to an entity associated with a destination address provided by the second probe packet ($P_2$).

The packet $P_1$ that is processed in FIGS. 10 and 11 may be a member of a suite of probe packets. For example, as mentioned in Subsection A.5, the probe-generating component 106 may generate a plurality of identical probe packets which it forwards to the same switch or switches. The probe analysis system 102 can use this kind of suite of probe packets to confirm whether a switch is consistently failing in the same manner, or only intermittently failing.

In conclusion, the following summary provides a non-exhaustive list of illustrative aspects of the technology set forth herein.

According to a first aspect, a method is described for measuring performance of a network. The method includes: providing an innermost probe packet, wherein the innermost probe packet has an innermost destination address, and generating a first probe packet. The first probe packet includes: a first destination address that identifies a first network component in the network; and the innermost probe packet, which is encapsulated in the first probe packet through at least one layer of encapsulation. The method also includes: sending the first probe packet to the first network component of the network based on the first destination address associated with the first probe packet; at the first network component, generating first mirrored information, the first mirrored information providing content that is associated with the first probe packet; providing the first mirrored information to a collection and analysis (CA) system; decapsulating the first probe packet to produce a second probe packet, the second probe packet including a second destination address; and sending the second probe packet to a second network component that is associated with the second destination address.

According to a second aspect, at the CA system, the method further includes: collecting one or more instances of mirrored information produced by one or more respective network components in the network, in response to injection of one or more probe packets into the network; and providing information regarding at least one network-related behavior based on the above-referenced one or more instances of mirrored information.

According to a third aspect, the above-referenced network-related behavior corresponds to packet loss that has occurred at at least one network component within the network.

According to a fourth aspect, the above-referenced network-related behavior corresponds to roundtrip latency associated with at least one link within the network.

According to a fifth aspect, the above-referenced network-related behavior corresponds to looping behavior, in which a packet is routed through a same network component more than once.

According to a sixth aspect, the above-referenced network-related behavior corresponds to an imbalance in a distribution of packets by a load balancing mechanism.

According to a seventh aspect, the above-referenced second probe packet corresponds to the innermost probe packet, and, as such, the second destination address corresponds to the innermost destination address. Here, the network sends the innermost probe packet to the second network component via zero, one or more additional network components.

According to an eighth aspect, the first network component or the second network component is a network component to be investigated for occurrence of packet loss.

According to a ninth aspect, the second network component alternatively: generates second mirrored information, the second mirrored information providing content that is associated with the second probe packet; provides the second mirrored information to the CA system; decapsulates the second probe packet to produce a third probe packet, the third probe packet including a third destination address that identifies a third network component; and sends the third probe packet to the third network component, based on the third destination address.

According to a tenth aspect, the third probe packet corresponds to the innermost probe packet, and, as such, the third destination address corresponds to the innermost destination address, and the third network component corresponds to the first network component.

According to an eleventh aspect, the first network component, upon receiving the third probe packet: generates third mirrored information, the third mirrored information providing content that is associated with the third probe packet; and provides the third mirrored information to the CA system.

According to a twelfth aspect, a link couples the first network component to the second network component. Further, a first instance of time information identifies a time of receipt, by the CA system, of the first mirrored information, and another instance of time information identifies a time of receipt, by the CA system, of the third mirrored information. The method further includes generating a roundtrip latency measure associated with the link based on the first instance of time information and the other instance of time information.

According a thirteenth aspect, the first network component is triggered to perform decapsulation upon receiving the first probe packet via a specified address, and the first network component is triggered to perform mirroring upon detecting status information in the first probe packet that indicates that mirroring is to be performed.

According to a fourteenth aspect, the method further includes collecting preliminary-phase instances of mirrored information in a preliminary phase of measurement. In this context, the first probe packet targets a particular part of the network that has generated anomalous behavior, as reflected in the preliminary-phase instances of mirrored information.

According to a fifteenth aspect, one or more computing devices are described for generating a probe packet for injection into a network. The device(s) include logic configured to produce a first probe packet. The first probe packet, in turn, includes: a first destination address that identifies a first network component in the network; an innermost probe packet, which is directly or indirectly encapsulated in the first probe packet, the innermost probe packet specifying an innermost destination address; and status information to indicate that the first probe packet is a packet to be mirrored by the first network component. The device(s) also include logic configured to send the first probe packet to the first network component of the network.

According to a sixteenth aspect, the first probe packet (referred to in the fifteenth aspect) includes, encapsulated in the first probe packet, a second probe packet. The second probe packet, in turn, includes: a second destination address that identifies a second network component in the network; and the innermost probe packet, which is encapsulated in the second probe packet.

According to a seventeenth aspect, the first probe packet (referred to in the fifteenth aspect) encapsulates a set of probe packets having respective destination addresses that, when followed, specifies a path in which at least one network component is encountered twice.

According to an eighteenth aspect, a hardware switch is described for use in processing packets in a network. The switch includes a receiving component configured to receive a packet having a destination address that identifies the hardware switch, wherein the packet that is received corresponds to a received packet. The switch also includes logic configured to determine whether the received packet corresponds to a probe packet. The switch also includes a mirroring component configured, when the received packet is determined to correspond to a probe packet, to: generate mirrored information that provides content that is associated with the probe packet; and provide the mirrored information to a collection and analysis (CA) system. The switch also includes: a decapsulation component configured to decapsulate the probe packet to produce another packet, which is encapsulated in the probe packet, and which specifies another destination address; and a sending component configured to send the other packet to the other destination address.

According to a nineteenth aspect, the other packet that is produced (referred to in the eighteenth aspect) encapsulates yet another packet.

According to a twentieth aspect, the probe packet (referred to in the eighteenth aspect) encapsulates a set of probe packets having respective destination addresses that, when followed, specifies a path in which at least one network component is encountered twice.

A twenty-first aspect corresponds to any combination (e.g., any permutation or subset) of the above-referenced first through twentieth aspects.

A twenty-second aspect corresponds to any method counterpart, device counterpart, system counterpart, means counterpart, computer readable storage medium counterpart, data structure counterpart, article of manufacture counterpart, graphical user interface presentation counterpart, etc. associated with the first through twenty-first aspects.

C. Representative Computing Functionality

FIG. 12 shows computing functionality 1202 that can be used to implement any software-driven feature of the probe analysis system 102 set forth in the above-described figures. For instance, the type of computing functionality 1202 shown in FIG. 12 can be used to implement any of: a software-implemented multiplexer (if used in the probe analysis system 102 of FIG. 1), any analysis component (AC), the result aggregation component 406, the management component 408, any application component (such as the application component 110), and so on. In all cases, the computing functionality 1202 represents one or more physical and tangible processing mechanisms.

The computing functionality 1202 can include one or more processing devices 1204, such as one or more central processing units (CPUs), and/or one or more graphical processing units (GPUs), and so on. The computing functionality 1202 can also include any storage resources 1206 for storing any kind of information, such as code, settings, data, etc. Without limitation, for instance, the storage resources 1206 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1202. The computing functionality 1202 may perform any of the functions described above when the processing devices 1204 carry out instructions stored in any storage resource or combination of storage resources.

As to terminology, any of the storage resources 1206, or any combination of the storage resources 1206, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 1202 also includes one or more drive mechanisms 1208 for interacting with any storage resource, such as a hard disk drive mechanism, an optical disk drive mechanism, and so on.

The computing functionality 1202 also includes an input/output component 1210 for receiving various inputs (via input devices 1212), and for providing various outputs (via output devices 1214). Illustrative input devices include a keyboard device, a mouse input device, and so on. One particular output mechanism may include a presentation device 1216 and an associated graphical user interface (GUI) 1218. The computing functionality 1202 can also include one or more network interfaces 1220 for exchanging data with other devices via one or more communication conduits 1222. One or more communication buses 1224 communicatively couple the above-described components together.

The communication conduit(s) 1222 can be implemented in any manner, e.g., by a local area network, a wide area network (e.g., the Internet), point-to-point connections, etc., or any combination thereof. The communication conduit(s) 1222 can include any combination of hardwired links, wireless links, routers, gateway functionality, name servers, etc., governed by any protocol or combination of protocols.

Alternatively, or in addition, any of the functions which have been attributed to CPU-driven functionality can be performed, at least in part, by one or more hardware logic components. For example, without limitation, the computing functionality 1202 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for measuring performance of a network, the method comprising:
    providing an innermost probe packet, the innermost probe packet having an innermost destination address;
    generating a first probe packet, the first probe packet including:
        a first destination address that identifies a first network component in the network; and
        the innermost probe packet, which is encapsulated in the first probe packet through at least one layer of encapsulation;
    sending the first probe packet to the first network component of the network based at least on the first destination address associated with the first probe packet;
    at the first network component, generating first mirrored information, the first mirrored information comprising a copy of at least some content of the first probe packet;
    providing the first mirrored information to a collection and analysis (CA) system;
    decapsulating the first probe packet to produce a second probe packet, the second probe packet including a second destination address; and
    sending the second probe packet to a second network component that is associated with the second destination address.

2. The method of claim 1, further comprising:
    at the CA system, collecting one or more instances of mirrored information produced by one or more respective network components in the network, in response to injection of one or more probe packets into the network, the one or more probe packets including the first probe packet; and
    providing information regarding a network-related behavior based on said one or more instances of mirrored information.

3. The method of claim 2, wherein the network-related behavior corresponds to packet loss that has occurred at least one network component within the network.

4. The method of claim 2, wherein the network-related behavior corresponds to roundtrip latency associated with at least one link within the network.

5. The method of claim 2, wherein the network-related behavior corresponds to looping behavior, in which an individual probe packet is routed through the same network component more than once.

6. The method of claim 2, wherein the network-related behavior corresponds to an imbalance in packet distribution by a load balancing mechanism.

7. The method of claim 1,
    wherein the second probe packet corresponds to the innermost probe packet, and, as such, the second destination address corresponds to the innermost destination address, and
    the method further comprises sending the innermost probe packet to the second network component via one or more additional network components.

8. The method of claim 7, further comprising:
    using the first probe packet to investigate the first network component or the second network component for occurrence of packet loss.

9. The method of claim 1, further comprising, at the second network component:
    generating second mirrored information, the second mirrored information comprising a copy of at least some content of the second probe packet;
    providing the second mirrored information to the CA system;
    decapsulating the second probe packet to produce a third probe packet, the third probe packet including a third destination address that identifies a third network component; and
    sending the third probe packet to the third network component, based at least on the third destination address.

10. The method of claim 9,
wherein the third probe packet corresponds to the innermost probe packet, and, as such, the third destination address corresponds to the innermost destination address, and
wherein the third network component corresponds to the first network component.

11. The method of claim 10, further comprising, at the first network component and upon receiving the third probe packet:
generates third mirrored information, the third mirrored information providing a copy of at least some content of the third probe packet; and
provides the third mirrored information to the CA system.

12. The method of claim 11,
wherein a link couples the first network component to the second network component,
wherein a first instance of time information identifies a time of receipt, by the CA system, of the first mirrored information,
wherein another instance of time information identifies a time of receipt, by the CA system, of the third mirrored information, and
the method further comprising generating a roundtrip latency measure associated with the link based at least on the first instance of time information and the another instance of time information.

13. The method of claim 1, further comprising:
triggering the first network component to perform decapsulation upon receiving the first probe packet via a specified address; and
triggering the first network component to perform mirroring upon detecting status information in the first probe packet that indicates that mirroring is to be performed.

14. The method of claim 1, further comprising:
collecting preliminary-phase instances of mirrored information in a preliminary phase of measurement,
wherein the first probe packet targets a particular part of the network that has generated anomalous behavior, as reflected in the preliminary-phase instances of mirrored information.

15. One or more computing devices comprising:
logic configured to produce a first probe packet that includes:
 a first destination address that identifies a first network component in a network;
 an innermost probe packet directly or indirectly encapsulated in the first probe packet, the innermost probe packet specifying an innermost destination address; and
 status information to indicate that the first probe packet is to be mirrored by the first network component by copying at least some information from the first probe packet into a mirrored packet; and
logic configured to send the first probe packet to the first network component of the network.

16. The one or more computing devices of claim 15, wherein the first probe packet includes a second probe packet encapsulated in the first probe packet, the second probe packet including:
a second destination address that identifies a second network component in the network; and
the innermost probe packet encapsulated in the second probe packet.

17. The one or more computing devices of claim 16, wherein the first probe packet encapsulates a set of probe packets having respective destination addresses that, when followed, specifies a path in which at least one network component is encountered twice.

18. A hardware switch comprising:
a receiving component configured to receive a packet, the received packet having a destination address that identifies the hardware switch
logic configured to determine whether the received packet is a probe packet;
a mirroring component configured to:
 when the received packet is determined to be a probe packet:
  generate mirrored information comprising a copy of at least some content of the probe packet; and
  provide the mirrored information to a collection and analysis (CA) system;
a decapsulation component configured to decapsulate the probe packet to produce another packet, which is encapsulated in the probe packet, and which specifies another destination address; and
a sending component configured to send the another packet to the another destination address.

19. The hardware switch of claim 18, wherein the another packet that is produced encapsulates yet another packet.

20. The hardware switch of claim 18, wherein the probe packet encapsulates a set of probe packets having respective destination addresses that, when followed, specifies a path in which at least one network component is encountered twice.

21. The method of claim 1, further comprising:
at the first network component, sending the first mirrored information to the CA system in a mirrored packet that is separate from the first probe packet and that includes the copy of the at least some content of the first probe packet.

* * * * *